United States Patent
Shailabh et al.

(10) Patent No.: US 12,190,061 B2
(45) Date of Patent: Jan. 7, 2025

(54) SYSTEM AND METHODS FOR NEURAL TOPIC MODELING USING TOPIC ATTENTION NETWORKS

(71) Applicant: ADOBE INC., San Jose, CA (US)

(72) Inventors: Shashank Shailabh, Bihar (IN); Madhur Panwar, Uttar Pradesh (IN); Milan Aggarwal, Delhi (IN); Pinkesh Badjatiya, Madhya Pradesh (IN); Simra Shahid, Uttar Pradesh (IN); Nikaash Puri, New Delhi (IN); S Sejal Naidu, Madhya Pradesh (IN); Sharat Chandra Racha, Telangana (IN); Balaji Krishnamurthy, Uttar Pradesh (IN); Ganesh Karbhari Palwe, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 437 days.

(21) Appl. No.: 17/644,856

(22) Filed: Dec. 17, 2021

(65) Prior Publication Data
US 2023/0169271 A1 Jun. 1, 2023

Related U.S. Application Data

(60) Provisional application No. 63/264,688, filed on Nov. 30, 2021.

(51) Int. Cl.
*G06F 40/289* (2020.01)
*G06F 40/30* (2020.01)
*G06F 40/40* (2020.01)

(52) U.S. Cl.
CPC ............ *G06F 40/289* (2020.01); *G06F 40/30* (2020.01); *G06F 40/40* (2020.01)

(58) Field of Classification Search
USPC ................................................ 704/7–10, 257
See application file for complete search history.

(56) References Cited

U.S. PATENT DOCUMENTS 11,914,670 B2 * 2/2024 Kumar .................. G06F 40/284
2011/0264443 A1 * 10/2011 Takamatsu .............. G06F 16/30
704/E11.001

(Continued)

OTHER PUBLICATIONS

1Aletras, et al., 2013, "Evaluating Topic Coherence Using Distributional Semantics", In Proceedings of the 10th International Conference on Computational Semantics (IWCS 2013) Long Papers (pp. 13-22), Available at https://aclanthology.org/W13-0102.pdf, 9 pages.

(Continued)

*Primary Examiner* — Leonard Saint-Cyr
(74) *Attorney, Agent, or Firm* — F. CHAU & ASSOCIATES, LLC

(57) ABSTRACT

Systems and methods for topic modeling are described. The systems and methods include encoding words of a document using an embedding matrix to obtain word embeddings for the document. The words of the document comprise a subset of words in a vocabulary, and the embedding matrix is trained as part of a topic attention network based on a plurality of topics. The systems and methods further include encoding a topic-word distribution matrix using the embedding matrix to obtain a topic embedding matrix. The topic-word distribution matrix represents relationships between the plurality of topics and the words of the vocabulary. The systems and methods further include computing a topic context matrix based on the topic embedding matrix and the word embeddings and identifying a topic for the document based on the topic context matrix.

20 Claims, 11 Drawing Sheets

(56) References Cited

U.S. PATENT DOCUMENTS

| | | | | |
|---|---|---|---|---|
| 2018/0285348 | A1* | 10/2018 | Shu | G06N 3/084 |
| 2019/0236139 | A1* | 8/2019 | DeFelice | G06N 3/044 |
| 2021/0241050 | A1* | 8/2021 | Gunaratna | G06N 3/042 |
| 2023/0289533 | A1* | 9/2023 | Gupta | G06N 3/044 |

OTHER PUBLICATIONS

2Andrieu, et al., 2003, "An Introduction to MCMC for Machine Learning", In Machine Learning, 50 (pp. 5-43), Available at https://www.cs.ubc.ca/~arnaud/andrieu_defreitas_doucet_jordan_intromontecarlomachinelearning.pdf, 39 pages.

3Bahdanau, et al., "Neural Machine Translation by Jointly Learning to Align and Translate", arXiv preprint arXiv:1409.0473v7 [cs.CL] May 19, 2016, 15 pages.

4Bianchi, et al., "Pre-training is a Hot Topic: Contextualized Document Embeddings Improve Topic Coherence", arXiv preprint arXiv:2004.03974v2 [cs.CL] Jun. 17, 2021, 8 pages.

5Bird, et al., 2009, "Natural Language Processing with Python", O'Reilly Media, Inc., Book Information available at https://www.oreilly.com/library/view/natural-language-processing/9780596803346/.

6Blei, et al., 2003, "Latent Dirichlet Allocation", In Journal of Machine Learning Research 3 (pp. 993-1022), Available at https://www.jmlr.org/papers/volume3/blei03a/blei03a.pdf, 30 pages.

7Burkhardt, et al., 2019, "Decoupling Sparsity and Smoothness in the Dirichlet Variational Autoencoder Topic Model", In Journal of Machine Learning Research 20 (pp. 1-27), Available at https://jmlr.org/papers/volume20/18-569/18-569.pdf, 27 pages.

8Card, et al., "Neural Models for Documents with Metadata", arXiv preprint arXiv:1705.09296v2 [stat.ML] Oct. 23, 2018, 13 pages.

9Chang, et al., 2009, "Reading Tea Leaves: How Humans Interpret Topic Models", In Advances in Neural Information Processing Systems, vol. 22 (pp. 288-296), Curran Associates, Inc., Available at https://proceedings.neurips.cc/paper/2009/file/f92586a25bb3145facd64ab20fd554ff-Paper.pdf, 9 pages.

10Chen, et al., "Keyphrase Generation with Correlation Constraints", arXiv preprint arXiv:1808.07185v1 [cs.CL] Aug. 22, 2018, 10 pages.

11Cho, et al., "Learning Phrase Representations using RNN Encoder-Decoder for Statistical Machine Translation", arXiv preprint arXiv:1406.1078v3 [cs.CL] Sep. 3, 2014, 15 pages.

12Deerwester, et al., 1990, "Indexing by Latent Semantic Analysis", Journal of the American Society for Information Science 41 (pp. 391-407), Available at http://lsa.colorado.edu/papers/JASIS.lsi.90.pdf, 34 pages.

13Devlin, et al., "BERT: Pre-training of Deep Bidirectional Transformers for Language Understanding", arXiv preprint arXiv:1810.04805v2 [cs.CL] May 24, 2019, 16 pages.

14Dieng, et al., "Topic Modeling in Embedding Spaces", arXiv preprint arXiv:1907.04907v1 [cs.IR] Jul. 8, 2019, 12 pages.

15Dieng, et al., "TopicRNN: A Recurrent Neural Network With Long-Range Semantic Dependency", arXiv preprint arXiv:1611.01702v2 [cs.CL] Feb. 27, 2017, 13 pages.

16Ding, et al., "Coherence-Aware Neural Topic Modeling", arXiv preprint arXiv:1809.02687v1 [cs.CL] Sep. 7, 2018, 7 pages.

17Goodfellow, et al., "Generative Adversarial Nets", arXiv preprint arXiv:1406.2661v1 [stat.ML] Jun. 10, 2014, 9 pages.

18Griffiths, et al., 2004, "Finding scientific topics", In Proceedings of the National academy of Sciences 101 (pp. 5228-5235), Available at https://www.pnas.org/content/pnas/101/suppl_1/5228.full.pdf, 8 pages.

19Gupta, et al., "Document Informed Neural Autoregressive Topic Models with Distributional Prior", arXiv preprint arXiv:1809.06709v2 [cs.CL] Jan. 14, 2019, 13 pages.

20Gururangan, et al., "Variational Pretraining for Semi-supervised Text Classification", arXiv preprint arXiv:1906.02242v1 [cs.CL] Jun. 5, 2019, 15 pages.

21Hochreiter, et al., 1997, "Long Short-Term Memory", In Neural Computation, 9 (pp. 1735-1780), Massachusetts Institute of Technology, Available at https://direct.mit.edu/neco/article/9/8/1735/6109/Long-Short-Term-Memory, 46 pages.

22Hoyle, et al., "Improving Neural Topic Models using Knowledge Distillation", arXiv preprint arXiv:2010.02377v1 [cs. CL] Oct. 5, 2020, 20 pages.

23Hoyle, et al., 2020b, "Improving Neural Topic Models using Knowledge Distillation", In Proceedings of the 2020 Conference on Empirical Methods in Natural Language Processing (EMNLP) (pp. 1752-1771), Association for Computational Linguistics, Available at https://aclanthology.org/2020.emnlp-main.137.pdf, 20 pages.

24Hu, et al., "Neural Topic Modeling with Cycle-Consistent Adversarial Training", arXiv preprint arXiv:2009.13971v1 [cs.CL] Sep. 29, 2020, 13 pages.

25Ioffe, et al., "Batch Normalization: Accelerating Deep Network Training by Reducing Internal Covariate Shift", arXiv preprint arXiv:1502.03167v3 [cs.LG] Mar. 2, 2015, 11 pages.

26Jin, et al., 2018, "Combining Deep Learning and Topic Modeling for Review Understanding in Context-Aware Recommendation", In Proceedings of the 2018 Conference of the North American Chapter of the Association for Computational Linguistics: Human Language Technologies, vol. 1 (Long Papers) (pp. 1605-1614), Association for Computational Linguistics, Available at https://aclanthology.org/N18-1145.pdf, 10 pages.

27Kingma, et al., "ADAM: A Method for Stochastic Optimization", arXiv arXiv:1412.6980v9 [cs.LG] Jan. 30, 2017, 15 pages.

28Kingma, et al., "Auto-Encoding Variational Bayes", arXiv preprint arXiv:1312.6114v10 [stat.ML] May 1, 2014, 14 pages.

29Kumar, et al., "Why Didn't You Listen to Me? Comparing User Control of Human-in-the-Loop Topic Models", arXiv preprint arXiv:1905.09864v2 [cs.CL] Jun. 4, 2019, 8 pages.

30Lang, 1995, "NewsWeeder: Learning to Filter Netnews", In Machine Learning Proceedings 95 (pp. 331-339), Elsevier, Available at http://citeseerx.ist.psu.edu/viewdoc/summary?doi=10.1.1.22.6286, 9 pages.

31Lau, et al., 2014, "Machine Reading Tea Leaves: Automatically Evaluating Topic Coherence and Topic Model Quality", In Proceedings of the 14th Conference of the European Chapter of the Association for Computational Linguistics (pp. 530-539), Association for Computational Linguistics, Available at https://aclanthology.org/E14-1056.pdf, 10 pages.

32McCallum, 2002, "MALLET: A machine learning for language toolkit", http://mallet.cs. umass.edu.

33Meng, et al., "Deep Keyphrase Generation", arXiv preprint arXiv:1704.06879v3 [cs.CL] May 31, 2021, 11 pages.

34Miao, et al., "Discovering Discrete Latent Topics with Neural Variational Inference", arXiv preprint arXiv:1706.00359v2 [cs.CL] May 21, 2018, 11 pages.

35Miao, et al., "Neural Variational Inference for Text Processing", arXiv preprint arXiv:1511.06038v4 [cs.CL] Jun. 4, 2016, 12 pages.

36Nan, et al., "Topic Modeling with Wasserstein Autoencoders", arXiv preprint arXiv:1907.12374v2 [cs.IR] Dec. 6, 2019, 37 pages.

37Peinelt, et al., 2020, "tBERT: Topic Models and BERT Joining Forces for Semantic Similarity Detection", In Proceedings of the 58th Annual Meeting of the Association for Computational Linguistics (pp. 7047-7055), Association for Computational Linguistics, Available at https://aclanthology.org/2020.acl-main.630.pdf, 9 pages.

38Pennington, at al., 2014, "GloVe: Global Vectors for Word Representation", In Proceedings of the 2014 conference on empirical methods in natural language processing (EMNLP) (pp. 1532-1543), Available at https://nlp.stanford.edu/pubs/glove.pdf, 12 pages.

39Pergola, et al., 2019, "TDAM: a Topic-Dependent Attention Model for Sentiment Analysis", In Journal of Information Processing and Management, Available at https://zenodo.org/record/3632937, 26 pages.

40Rehurek, et al., 2010, "Software Framework for Topic Modelling with Large Corpora", In Proceedings of the LREC 2010 Workshop on New Challenges for NLP Frameworks (pp. 45-50) ELRA, Available at https://radimrehurek.com/rec2010_final.pdf, 5 pages.

(56) References Cited

OTHER PUBLICATIONS

41Rezaee, et al., "A Discrete Variational Recurrent Topic Model without the Reparametrization Trick", arXiv preprint arXiv:2010. 12055v1 [cs.LG] Oct. 22, 2020, 16 pages.
42Sia, et al., "Tired of Topic Models? Clusters of Pretrained Word Embeddings Make for Fast and Good Topics too!", arXiv preprint arXiv:2004.14914v2 [cs.CL] Oct. 6, 2020, 9 pages.
43Srivastava, et al., "Autoencoding Variational Inference for Topic Models", arXiv preprint arXiv:1703.01488v1 [stat.ML] Mar. 4, 2017, 12 pages.
44Srivastava, et al., 2014, "Dropout: A Simple Way to Prevent Neural Networks from Overfitting", In Journal of Machine Learning Research 15 (pp. 1929-1958), Available at https://jmlr.org/papers/volume15/srivastava14a/srivastava14a.pdf, 30 pages.
45Steyvers, 2007, "Probabilistic topic models", In "Handbook of latent semantic analysis" (pp. 424-440), Routledge, Book information available at https://www.routledgehandbooks.com/doi/10.4324/9780203936399.ch21.
46Thibaux, et al., 2007, "Hierarchical Beta Processes and the Indian Buffet Process", In Proceedings of Machine Learning Research, vol. 2 (pp. 564-571), PMLR, Available at http://proceedings.mlr.press/v2/thibaux07a/thibaux07a.pdf, 8 pages.
47Tolstikhin, et al., "Wasserstein Auto-Encoders", arXiv preprint arXiv:1711.01558v4 [stat.ML] Dec. 5, 2019, 20 pages.
48Viegas, et al., 2020, "CluHTM—Semantic Hierarchical Topic Modeling based on CluWords", In Proceedings of the 58th Annual Meeting of the Association for Computational Linguistics (pp. 8138-8150), Association for Computational Linguistics, Available at https://aclanthology.org/2020.acl-main.724.pdf, 13 pages.
49Wang, et al., "Neural Topic Modeling with Bidirectional Adversarial Training", arXiv preprint arXiv:2004.12331v1 [cs.CL] Apr. 26, 2020, 11 pages.
50Wang, et al., "ATM: Adversarial-neural Topic Model", arXvi preprint arXiv:1811.00265v2 [cs.AI] Aug. 21, 2019, 15 pages.
51Wang, et al., 2020, "Neural Topic Model with Attention for Supervised Learning", In Proceedings of the 23rd International Conference on Artificial Intelligence and Statistics (AISTATS), PMR vol. 108, Available at http://proceedings.mlr.press/v108/wang20c/wang20c.pdf, 9 pages.
62Wang, et al., "Topic-Aware Neural Keyphrase Generation for Social Media Language", arXiv preprint arXiv:1906.03889v1 [cs.CL] Jun. 10, 2019, 11 pages.
53Wu, et al., 2020, "Neural Mixed Counting Models for Dispersed Topic Discovery", In Proceedings of the 58th Annual Meeting of the Association for Computational Linguistics (pp. 6159-6169), Association for Computational Linguistics, Available at https://aclanthology.org/2020.acl-main.548.pdf, 11 pages.
54Zaheer, et al., 2017, "Latent LSTM Allocation Joint Clustering and Non-Linear Dynamic Modeling of Sequential Data", In Proceedings of the 34th International Conference on Machine Learning, PMLR vol. 70, Available at http://proceedings.mlr.press/v70/zaheer17a/zaheer17a.pdf, 10 pages.
55Zhang, et al., 2020, "Topic Modeling on Document Networks with Adjacent-Encoder", In Proceedings of the AAAI Conference on Artificial Intelligence 34 (pp. 6737-6745), Available at https://ojs.aaai.org/index.php/AAAI/article/view/6152, 9 pages.
56Zhang, et al., "WHAI: Weibull Hybrid Autoencoding Inference for Deep Topic Modeling", arXiv preprint arXiv:1803.01328v2 [stat.ML] Apr. 25, 2020, 15 pages.
57Zhang, et al., 2016, "Keyphrase Extraction Using Deep Recurrent Neural Networks on Twitter", In Proceedings of the 2016 Conference on Empirical Methods in Natural Language Processing (pp. 836-845), Association for Computational Linguistics, Available at https://aclanthology.org/D16-1080.pdf, 10 pages.
58Zhang, et al., "Character-level Convolutional Networks for Text Classification", arXix preprint arXiv:1509.01626v3 [cs.LG] Apr. 4, 2016, 9 pages.
59Zhao, et al., 2021, "Neural Topic Model via Optimal Transport", In International Conference on Learning Representations (pp. 1-15), Available at https://openreview.net/forum?id=Oos98K9Lv-k, 15 pages.
60Zhou, et al., "Neural Topic Modeling by Incorporating Document Relationship Graph", arXiv preprint arXiv:2009.13972v1 [cs.CL] Sep. 29, 2020, 7 pages.
61Zhu, et al., "Unpaired Image-to-Image Translation using Cycle-Consistent Adversarial Networks", arXiv preprint arXiv:1703. 10593v7 [cs.CV] Aug. 24, 2020, 18 pages.
62Zhu, et al., "A Neural Generative Model for Joint Learning Topics and Topic-Specific Word Embeddings", arXiv preprint arXiv:2008. 04702v1 [cs.CL] Aug. 11, 2020, 14 pages.

* cited by examiner

SYSTEM AND METHODS FOR NEURAL TOPIC MODELING USING TOPIC ATTENTION NETWORKS

CROSS-REFERENCE TO RELATED APPLICATION

This application claims priority under 35 U.S.C. § 119(e) to Provisional Application No. 63/264,688, filed Nov. 30, 2021, the disclosure of which is incorporated by reference herein in its entirety.

BACKGROUND

The following relates generally to natural language processing, and more specifically to topic modeling.

Natural language processing (NLP) refers to techniques for using computers to interpret or generate natural language. In some cases, NLP tasks involve assigning annotation data such as grammatical information to words or phrases within an expression. Some algorithms, such as decision trees, utilize hard if-then rules. Other systems use neural networks or statistical models which make soft, probabilistic decisions based on attaching real-valued weights to input features. For example, a variety of different machine-learning algorithms have been applied to NLP tasks.

Latent semantic analysis (LSA) is an example of a natural language processing (NLP) technique for analyzing relationships between documents and the terms within the documents. An LSA-based system may depend on the assumption that words that are close in meaning will occur close to each other, or in similar documents (i.e., documents containing similar sets of terms). In some cases, matrices containing word counts may be generated from the documents. The matrices may then be processed using singular value decomposition (SVD) to reduce the number of matrix rows while preserving structure among columns. The documents may then be compared by taking the cosine of the angle between the two vectors (or the dot product between the normalizations of the two vectors) formed by any two columns. Values close to 1 represent similar documents and values close to 0 represent documents with little similarity.

Topic modeling is an example of an NLP task. Topic models can be used to extract topics which occur commonly across documents in a corpus. In some examples, each topic is interpreted as a group of semantically coherent words that represent a common concept. In addition to gaining insights from unstructured texts, topic models have been used in several tasks, such as learning text representations for document classification, key phrase extraction, understanding reviews for e-commerce recommendations, semantic similarity detection between texts, etc.

However, document encoding in conventional topic models fail to effectively capture document distribution and semantics for domain specific topics. Furthermore, machine learning models for topic modeling are computationally intensive. For example, conventional topic modeling methods use an expensive iterative inference step that has to be performed for each document. Therefore, there is a need in the art for improved systems and methods of topic modeling.

SUMMARY

The present disclosure describes systems and methods for topic modeling that can identify a topic of a document. In some examples, words of a document are encoded using an embedding matrix to obtain word embeddings for the document. The embedding matrix is trained as part of a topic attention network based on a plurality of topics. A topic-word distribution matrix is encoded using the embedding matrix to obtain a topic embedding matrix representing relationships between the plurality of topics and the words of the vocabulary. A topic context matrix is computed based on the topic embedding matrix and the word embeddings. A topic for the document is identified based on the topic context matrix.

A method, apparatus, non-transitory computer-readable medium, and system for topic modeling are described. One or more aspects of the method, apparatus, non-transitory computer-readable medium, and system include: encoding words of a document using an embedding matrix to obtain word embeddings for the document, wherein the words of the document comprise a subset of words in a vocabulary, and wherein the embedding matrix is trained as part of a topic attention network based on a plurality of topics; encoding a topic-word distribution matrix using the embedding matrix to obtain a topic embedding matrix, wherein the topic-word distribution matrix represents relationships between the plurality of topics and the words of the vocabulary; computing a topic context matrix based on the topic embedding matrix and the word embeddings; and identifying a topic for the document based on the topic context matrix.

A method, apparatus, non-transitory computer-readable medium, and system for topic modeling are described. One or more aspects of the method, apparatus, non-transitory computer-readable medium, and system include: encoding words of a document using an embedding matrix to obtain word embeddings for the document, wherein the words of the document comprise a subset of words in a vocabulary; generating a sequence of hidden representations corresponding to the word embeddings using a sequential encoder, wherein the sequence of hidden representations comprises an order based on an order of the words in the document; computing a context vector based on the sequence of hidden representations; generating a latent vector based on the context vector using an auto-encoder; computing a loss function based on an output of the auto-encoder; and updating parameters of the embedding matrix and a topic attention network based on the output of the auto-encoder.

An apparatus, non-transitory computer-readable medium, and system for topic modeling are described. One or more aspects of the apparatus, non-transitory computer-readable medium, and system include: an embedding component configured to encode words of a document using an embedding matrix to obtain word embeddings for the document, wherein the words of the document comprise a subset of words in a vocabulary from a corpus of documents, and wherein the embedding matrix is trained based on the corpus of documents; a sequential encoder configured to generate a sequence of hidden representations corresponding to the word embeddings; a topic attention network configured to generate a context vector based on the word embeddings and sequence of hidden representations; and an auto-encoder configured to predict the set of words for the document based on the context vector.

DETAILED DESCRIPTION

Figure 1:
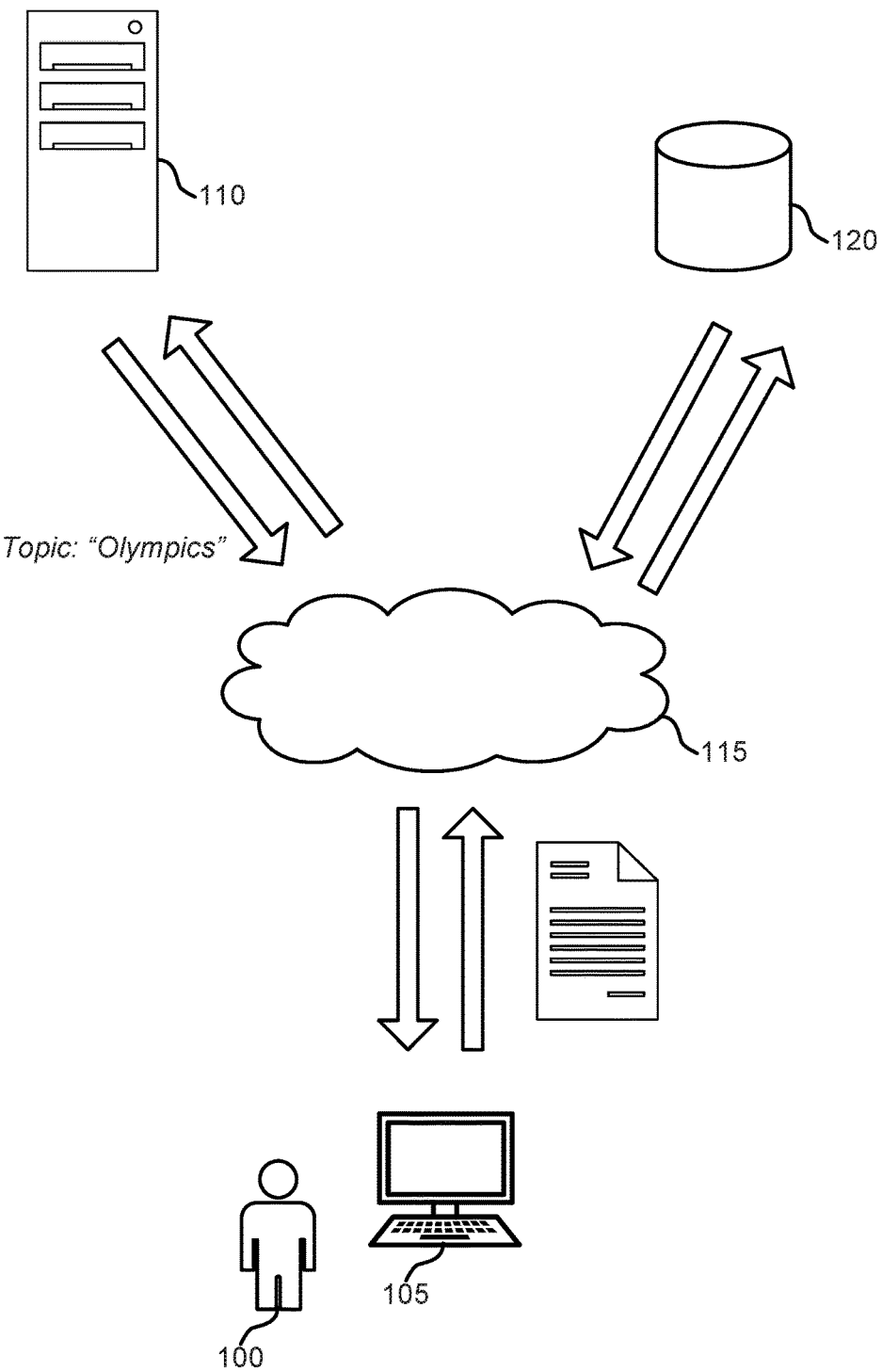
FIG. 1 shows an example of a topic modeling system according to aspects of the present disclosure.

Natural language processing (NLP) refers to techniques for using computers to interpret or generate natural language. Topic modeling is an example of an NLP task. In a topic modeling process, neural variational inference topic models prominently use a Bag-of-Words (BoW) representation of the document that is determined on the basis of a frequency count of each vocabulary token in the document. However, document encoding in conventional topic models fails to capture document distribution and semantics at a desired level of effectiveness. For example, conventional topic modeling methods can require an expensive iterative inference step that has to be performed for each document.

To better capture document distribution and semantics, an embodiment of the present disclosure includes a technologically advantageous, deep-learning based machine learning model that uses a topic attention framework that processes a sequence of tokens in an input document. The machine learning model can perform separate attention for each topic using a corresponding word probability distribution to obtain topic context vectors. The machine learning model can determine topic weights that represent the relative proportion of each topic in the input document. The machine learning model can use these topic weights to aggregate a composed topic context vector. The machine learning model can use the composed context vector to perform variational inference followed by a reconstruction of an original BoW vector to compute a loss function that is used to train the machine learning model.

For example, the topic attention network can encode a topic-word distribution matrix to obtain a topic embedding matrix. The topic embedding matrix represents relationships between a plurality of topics and words in a vocabulary. The topic attention network can also compute a topic context matrix based on the topic embedding matrix and the word embeddings for a document. This topic context matrix allows a technologically advantageous topic selection component to identify a topic for the document. Accordingly, the unconventional topic attention network and topic selection component can more effectively identify a topic of a given input document than conventional topic modeling systems.

Some embodiments of the present disclosure include a document encoding framework for topic modeling that leverages a topic-word distribution to perform attention effectively over a sequence of tokens in a topic-aware manner. Some embodiments of the present disclosure include a mechanism to factor in topic-word distribution into an attention mechanism. Accordingly, embodiments of the present disclosure can achieve increased normalized pointwise mutual information (NPMI) coherence (e.g., a more coherent and increased topic accuracy), better latent document-topic features with a higher document classification accuracy, and better topic guided supervised key phrase generation than conventional topic modeling systems.

Embodiments of the present disclosure may be used in a topic modeling context. For example, a topic modeling apparatus based on the present disclosure may generate a representation of a context of a user-provided document, identify a topic for the document, and provide the topic to the user. An example application of the inventive concept in the topic modeling context is provided with reference to FIGS. 1-2. Details regarding the architecture of an example topic modeling apparatus are provided with reference to FIGS. 3-6. Examples of a process for topic modeling are provided with reference to FIGS. 7-8. Examples of training a machine learning model are provided with reference to FIGS. 9-11.

Topic Modeling System

FIG. 1 shows an example of a topic modeling system according to aspects of the present disclosure. The example shown includes user 100, user device 105, topic modeling apparatus 110, cloud 115, and database 120. In the example of FIG. 1, one or more users 100 can provide a document to topic modeling apparatus 110 via user device 105 and cloud 115. Topic modeling apparatus 110 can generate a representation of the context of the document, identify a topic for the document, and provide a topic to one or more users 100.

One or more users 100 communicates with the topic modeling apparatus 110 via one or more user devices 105 and the cloud 115. A user device 105 may be a personal computer, laptop computer, mainframe computer, palmtop computer, personal assistant, mobile device, or any other suitable processing apparatus. one or more users 100 may interact with user device 105 via a user interface and an input component. An input device may be a computer mouse, keyboard, keypad, trackball, and/or voice recognition device. An input component may include any combination of devices that allow users to input information into a computing device, such as buttons, a keyboard, switches, and/or dials. In addition, the input component may include a touch-screen digitizer overlaid onto the display that can sense touch and interact with the display. A user interface enables a user to interact with user device 105.

In some embodiments, the user interface may include an audio device, such as an external speaker system, an external display device such as a display screen, or an input device (e.g., remote control device interfaced with the user interface directly or through an input/output (IO) controller module). In some cases, a user interface may be a graphical user interface (GUI). In some examples, the user device 105 includes software that can select one or more documents, provide the one or more documents to the topic modeling apparatus 110, and receive topics for the one or more documents from the topic modeling apparatus 110.

Topic modeling apparatus 110 can include a computer implemented network comprising a training component and a machine learning model. Topic modeling apparatus 110 can also include one or more processors, a memory subsystem, a communication interface, an I/O interface, one or more user interface components, and a bus. Additionally, topic modeling apparatus 110 can communicate with user device 105 and database 120 via cloud 115.

In some cases, topic modeling apparatus 110 is implemented on a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices 105/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Topic modeling apparatus 110 can be used, for example, in a discussion forum context. Generally, in a discussion forum, users can post queries and have discussions about various topics. These posts can be answered by topic experts. Without the intervention of topic experts in these discussion forums, most user queries will be unanswered and users will be frustrated and will likely discontinue using a product that is associated with the discussion forum. For a healthy, organic forum community, user questions should be directed to the relevant topic experts. The quicker the queries are discovered/answered, the more likely it is that product customers will be retained. When a large volume of user queries are posted, it can become difficult for the topic experts to productively identify relevant posts that they want to answer. To increase efficiency and productivity of the topic experts, topic modeling apparatus 110 can use the machine learning model to extract topics from user queries in an unsupervised manner. Once topics are discovered, topic modeling apparatus 110 can map the topics to particular users according to historical interaction data based on their interest in a given topic.

Accordingly, the machine learning model of the topic modeling apparatus 110 can be used for recommending relevant posts to users and experts in a discussion forum. For example, insights provided by the machine learning model in the form of topic words from unstructured raw documents can be used for analyzing text content on a platform in which segments for viewers can be created and modified based on topic preferences of the platform's users. This can be useful in cloud servers.

In some cases, the machine learning model can analyze textual reviews on a product page on e-commerce websites and get a gist of product attributes in terms of topics. Insights obtained in the form of topics can help a retailer understand what attributes users of the product are talking about, liking, disliking, etc. Recommendation systems can be augmented by such topics so that hidden item and user factors (commonly obtained during collaborative filtering in recommendation systems) can be tied with these topics. This can enable customers or users of commerce platforms to incorporate review-and-topic-based information into their recommendation engines.

Further detail regarding the architecture of topic modeling apparatus 110 will be provided with reference to FIGS. 3-6. Further detail regarding a topic modeling process is provided with reference to FIGS. 7-8. Further detail regarding a process for training a machine learning model is provided with reference to FIGS. 9-11.

A cloud 115 is a computer network configured to provide on-demand availability of computer system resources, such as data storage and computing power. In some examples, the cloud 115 provides resources without active management by the user 100. The term cloud 115 is sometimes used to describe data centers available to many users 100 over the Internet. Some large cloud 115 networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with a database 120 controller. In other cases, a database 120 controller may operate automatically without user 100 interaction.

Figure 2:
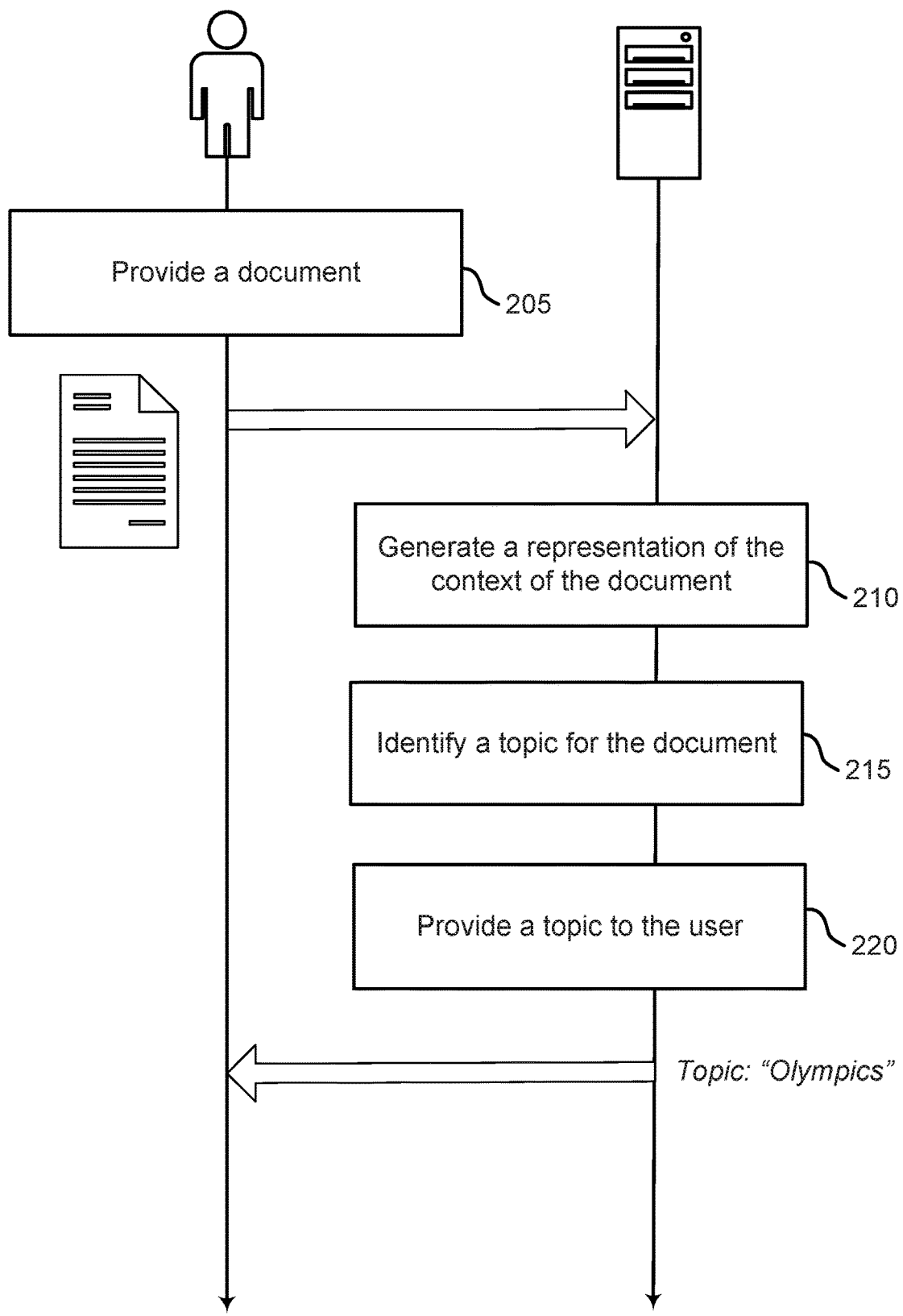
FIG. 2 shows an example of topic modeling according to aspects of the present disclosure.

FIG. 2 shows an example of topic modeling according to aspects of the present disclosure. Referring to FIG. 2, a user (e.g., user 100 of FIG. 1) can provide a document to a topic modeling apparatus (such as topic modeling apparatus 110) via a user device. The topic modeling apparatus can generate a representation of the context of the document, identify a topic for the document, and provide a topic to the users.

At operation 205, the user provides a document. In some cases, the operations of this step refer to, or may be performed by, a user as described with reference to FIG. 1. For example, in some cases, the user can select a document of which knowledge of its topic would be beneficial (such as a forum post, an e-commerce website, a news article, an encyclopedia entry, etc.) and provide the document to the topic modeling apparatus via a user device.

At operation 210, the system generates a representation of the context of the document. In some cases, the operations of this step refer to, or may be performed by, a topic modeling apparatus as described with reference to FIG. 1. For example, a machine learning model of the topic modeling apparatus can process the document via one or more deep-learning based neural networks to create a machine readable representation of the document from which a topic can be identified. Further detail regarding the operations of this step is provided with reference to FIGS. 3-6.

At operation 215, the system identifies a topic for the document. In some cases, the operations of this step refer to, or may be performed by, topic modeling apparatus as described with reference to FIG. 1. For example, the machine learning model of the topic modeling apparatus can process the machine readable representation of the document to identify a topic of the document via one or more deep-learning based neural networks. Further detail regarding the operations of this step is provided with reference to FIGS. 3-6.

At operation 220, the system provides a topic to the user. In some cases, the operations of this step refer to, or may be performed by, topic modeling apparatus as described with reference to FIG. 1. For example, the topic modeling apparatus can display the topic of the user-provided document to the user via a GUI of the user device.

System Architecture

An apparatus for topic modeling is described with reference to FIGS. 3-6. One or more aspects of the apparatus include an embedding component configured to encode words of a document using an embedding matrix to obtain word embeddings for the document, wherein the words in the document comprise a subset of words in a vocabulary from a corpus of documents, and wherein the embedding matrix is trained based on the corpus of documents; a sequential encoder configured to generate a sequence of hidden representations corresponding to the word embeddings; a topic attention network configured to generate a context vector based on the word embeddings and sequence of hidden representations; and an auto-encoder configured to predict the set of words for the document based on the context vector.

Some examples of the apparatus further include a topic selection component configured to select a topic for each document in a corpus of documents. Some examples of the apparatus further include a vocabulary component configured to select the words in the vocabulary based on a corpus of documents.

Figure 3:
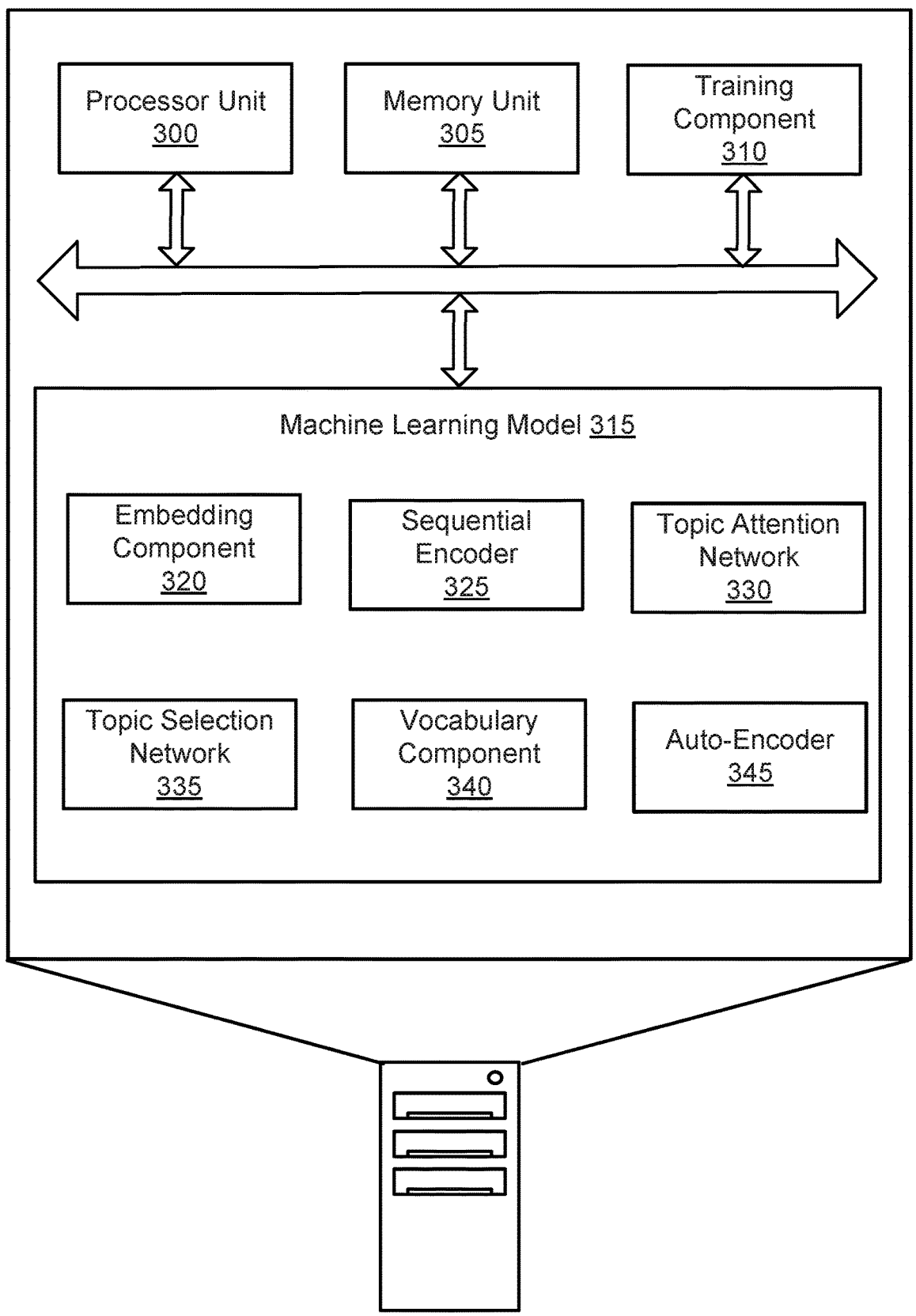
FIG. 3 shows an example of a topic modeling apparatus according to aspects of the present disclosure.

FIG. 3 shows an example of a topic modeling apparatus according to aspects of the present disclosure. The example shown includes processor unit 300, memory unit 305, training component 310, and machine learning model 315. The topic modeling apparatus of FIG. 3 can be a personal computer, laptop computer, mainframe computer, palmtop computer, personal assistant, mobile device, or any other suitable processing apparatus. In some embodiments, the topic modeling apparatus of FIG. 3 is an example of, or includes aspects of, topic modeling apparatus 110 of FIG. 1.

Processor unit 300 can include one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 300 is configured to operate a memory array included in memory unit 305 using a memory controller. In other cases, a memory controller is integrated into processor unit 300. In some cases, processor unit 300 is configured to execute computer-readable instructions stored in memory unit 305 to perform various functions. In some embodiments, processor unit 300 includes special purpose components for modem processing, baseband processing, digital signal processing, or transmission processing.

Memory unit 305 can include one or more memory devices. Examples of a memory device include random access memory (RAM), read-only memory (ROM), or a hard disk. Examples of memory devices include solid state memory and a hard disk drive. In some embodiments, memory unit 305 can include a memory array that includes a plurality of memory cells. In some examples, memory unit 305 can store computer-readable, computer-executable software including instructions that, when executed, cause a processor of processor unit 300 to perform various functions described herein. In some cases, memory unit 305 contains, among other things, a basic input/output system (BIOS) which controls basic hardware or software operation such as interactions with peripheral components or devices. In some cases, memory unit 305 includes a memory controller that operates memory cells of memory unit 305. For example, the memory controller can include a row decoder, column decoder, or both. In some cases, memory cells within memory unit 305 store information in the form of a logical state.

Machine learning model 315 can include one or more artificial neural networks (ANNs). In one aspect, machine learning model 315 includes embedding component 320, sequential encoder 325, topic attention network 330, topic selection component 335, vocabulary component 340, and auto-encoder 345, each of which can be implemented as one or more artificial neural networks.

An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During a training process that can be performed by training component 310, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term "loss function" refers to a function that impacts how a machine learning model is trained in a supervised learning setting. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

In one aspect, machine learning model 315 includes embedding component 320, sequential encoder 325, topic attention network 330, topic selection component 335, vocabulary component 340, and auto-encoder 345.

According to some aspects, embedding component 320 encodes words of a document using an embedding matrix to obtain word embeddings for the document, where the words in the document include a subset of words in a vocabulary. The term "word embedding" refers to a learned representation for text in which words that have a same meaning have a similar representation. Glove and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

In some embodiments, the embedding matrix is trained as part of a topic attention network 330 based on a set of topics. In some embodiments, the words in the document comprise a subset of words in a vocabulary from a corpus of documents. In some embodiments, the embedding matrix is trained based on the corpus of documents. Embedding component 320 is an example of, or includes aspects of, the corresponding element described with reference to FIG. 4.

According to some aspects, sequential encoder 325 generates a sequence of hidden representations corresponding to the word embeddings, where the sequence of hidden representations includes an order based on an order of the words in the document. According to some aspects, sequential encoder 325 is configured to generate a sequence of hidden representations corresponding to the word embeddings. The term "hidden representation" refers to a machine-readable data representation of an input that is learned from a neural network's "hidden" (i.e., intermediate) layers and is produced by the network's output layer. As the neural network's understanding of the input improves as it is trained, the hidden representation is progressively differentiated from earlier iterations. Sequential encoder 325 is an example of, or includes aspects of, the corresponding element described with reference to FIG. 4.

According to some aspects, topic attention network 330 encodes a topic-word distribution matrix using the embedding matrix to obtain a topic embedding matrix, where the topic-word distribution matrix represents relationships between the set of topics and the words of the vocabulary. In some examples, topic attention network 330 computes a topic context matrix based on the topic embedding matrix and the sequence of hidden representations. In some examples, topic attention network 330 computes an attention alignment matrix based on the topic embedding matrix and the sequence of hidden representations, where the topic context matrix is based on the attention alignment matrix. In some examples, topic attention network 330 computes a context vector for the document based on the document-topic distribution vector and the topic context matrix, where the topic attention network 330 is trained based on the topic context matrix. In some aspects, the topic-word distribution matrix is based on a linear layer used to decode a document—word representation from a latent vector. In some examples, topic attention network 330 selects a row of the topic context matrix corresponding to the highest value of the document-topic vector as the context vector. In some examples, topic attention network 330 computes an average of rows of the topic context matrix weighted by values of the document-topic vector to obtain the context vector. In some examples, topic attention network 330 normalizes the word embeddings based on a number of words in the vocabulary to obtain normalized word embeddings, where the document-topic vector is based on the normalized word embeddings.

According to some aspects, topic attention network 330 computes a context vector based on the sequence of hidden representations. In some examples, topic attention network 330 encodes a topic-word distribution matrix using the embedding matrix to obtain a topic embedding matrix, where the topic-word distribution matrix represents relationships between the topics and the words of the vocabulary. In some examples, topic attention network 330 computes a document embedding based on the words in the document and the embedding matrix. In some examples, topic attention network 330 computes a document-topic vector based on the topic embedding matrix and the document embedding. In some examples, topic attention network 330 computes an attention alignment matrix based on the topic embedding matrix and the sequence of hidden representations. In some examples, topic attention network 330 computes a topic context matrix based on the attention alignment matrix and the sequence of hidden representations, where the context vector is calculated based on the document-topic vector and the topic context matrix.

In some examples, topic attention network 330 selects a row of the topic context matrix corresponding to the highest value of the document-topic vector as the context vector. In some examples, topic attention network 330 computes an average of rows of the topic context matrix weighted by values of the document-topic vector to obtain the context vector. In some examples, topic attention network 330 normalizes the word embeddings based on a number of words in the vocabulary to obtain normalized word embeddings, where the document-topic vector is based on the normalized word embeddings. According to some aspects, topic attention network 330 is configured to generate a context vector based on the word embeddings and sequence of hidden representations.

Topic attention network 330 is an example of, or includes aspects of, the corresponding element described with reference to FIGS. 4 and 5.

According to some aspects, topic selection component 335 identifies a topic for the document based on the topic context matrix. According to some aspects, topic selection component 335 selects a topic for each document in a corpus of documents. Topic selection component 335 is an example of, or includes aspects of, the corresponding element described with reference to FIG. 5.

According to some aspects, vocabulary component 340 is configured to select the words in the vocabulary based on a corpus of documents. According to some aspects, vocabulary component 340 selects the words in the vocabulary based on a corpus of documents, where the document is selected from the corpus of documents. Vocabulary component 340 is an example of, or includes aspects of, the corresponding element described with reference to FIG. 4.

According to some aspects, auto-encoder 345 generates a first vector and a second vector based on the context vector. In some examples, auto-encoder 345 samples a random noise term. In some examples, auto-encoder 345 generates a latent vector based on the context vector. In some examples, auto-encoder 345 computes a sum of the first vector and a product of the second vector and the random noise term to obtain a latent vector. In some examples, auto-encoder 345 decodes the latent vector to obtain a predicted word vector. In some examples, auto-encoder 345 identifies a set of words for each of the set of topics based on the topic-word distribution matrix. In some examples, the output of the auto-encoder 345 includes the predicted word vector. According to some aspects, auto-encoder 345 is configured to predict a set of words for the document based on the context vector. Auto-encoder 345 is an example of, or includes aspects of, the corresponding element described with reference to FIG. 6.

In some embodiments, training component 310 can perform unsupervised learning on the machine learning model 315 based on a loss function. Unsupervised learning is one of three basic machine learning paradigms, alongside supervised learning and reinforcement learning. Unsupervised learning draws inferences from datasets consisting of input data without labeled responses. Unsupervised learning may be used to find hidden patterns or groupings in data. For example, cluster analysis is a form of unsupervised learning. Clusters may be identified using measures of similarity such as Euclidean or probabilistic distance.

According to some aspects, training component 310 trains the topic attention network 330 based on the context vector. In some examples, training component 310 computes a loss function based on a comparison between the predicted word vector and the words in the document, where the training the topic attention network is further based on the loss function. According to some aspects, training component 310 computes a loss function based on an output of the auto-encoder. In some examples, training component 310 computes the loss function based on a comparison between the predicted word vector and the words in the document, where the training the topic attention network is further based on the loss function. In some examples, training component 310 updates parameters of the embedding matrix and the topic attention network 330 based on the output of the auto-encoder. Further detail regarding the training component 310 will be provided with reference to FIG. 6.

Figure 4:
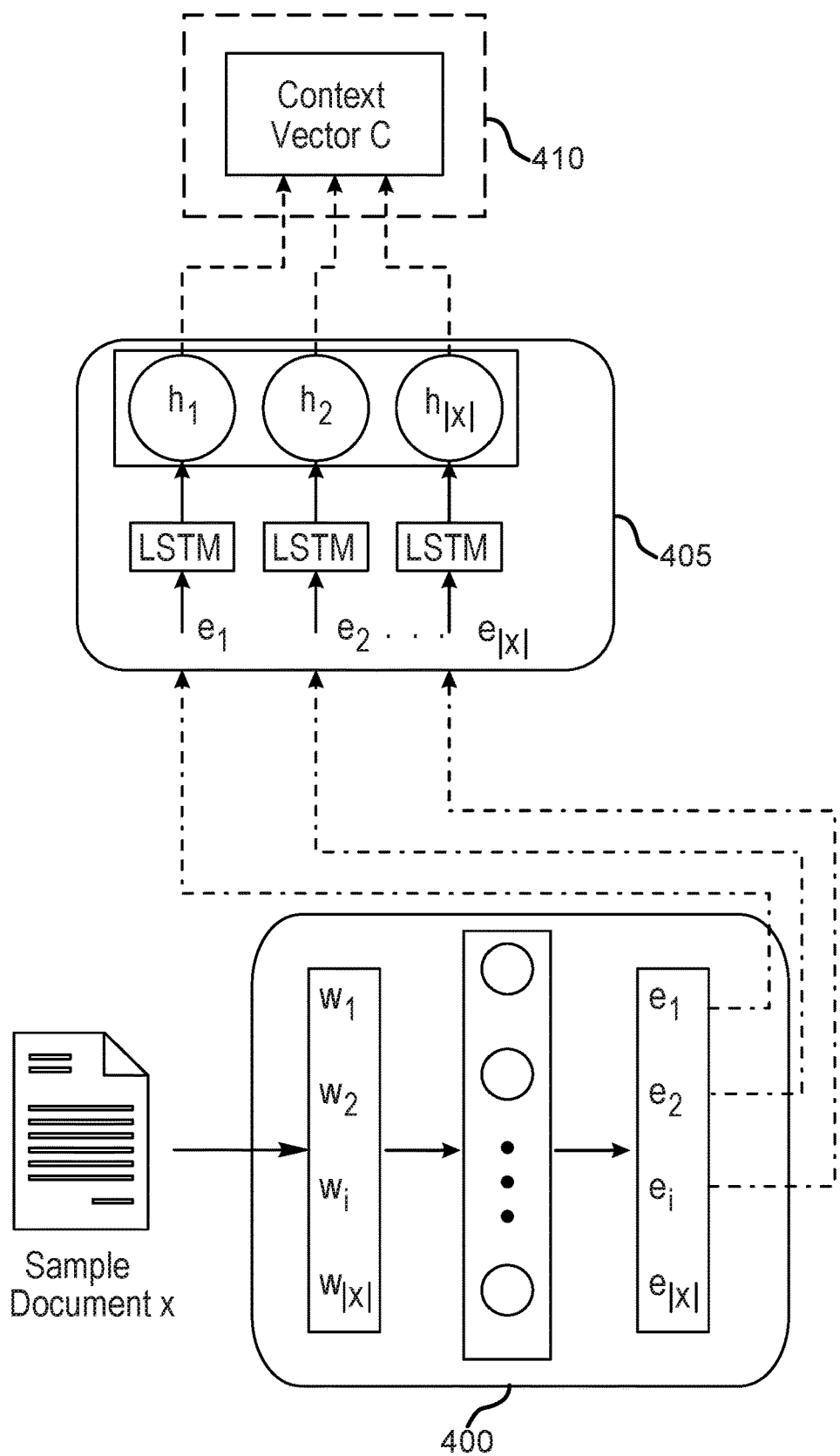
FIG. 4 shows an example of a sequential encoder according to aspects of the present disclosure.

FIG. 4 shows an example of a sequential encoder 405 according to aspects of the present disclosure. FIG. 4 illustrates embedding component 400, sequential encoder 405, and topic attention network 410. Embedding component 400 is an example of, or includes aspects of, the corresponding element described with reference to FIG. 3. Sequential encoder 405 is an example of, or includes aspects of, the corresponding element described with reference to FIG. 3. Topic attention network 410 is an example of, or includes aspects of, the corresponding element described with reference to FIGS. 3 and 5.

Referring to FIG. 4, a sample document x is provided to embedding component 400. According to some aspects, embedding component 400 encodes words of a document using an embedding matrix to obtain word embeddings for the document, where the words in the document include a subset of words in a vocabulary. In some embodiments, the words in the document comprise a subset of words in a vocabulary from a corpus of documents. In some embodiments, the embedding matrix is trained based on the corpus of documents.

For example, given a corpus of documents C with |C| documents $\{x_1, x_2, \ldots x_{|C|}\}$, embedding component 400 can process each document x into a BoW vector $x_{bow} \in \mathbb{R}^{|V|}$ and as a token sequence $x_{seq}$, where V represents the vocabulary. In some embodiments, each word $w_j \in x_{seq}$ is embedded by embedding component 400 as $e_j \in \mathbb{R}^E$ through an embedding matrix $E \in \mathbb{R}^{|V| \times E}$ (E=Embedding Dimension) initialized with GloVe.

According to some aspects, a vocabulary component is configured to select the words in a vocabulary based on a corpus of documents. In some examples, the vocabulary component is pre-trained to recognize and filter out unimportant words in a document so that the words in the vocabulary that are processed by the embedding component 400 are more likely to be relevant to the task of identifying a topic for the document.

According to some aspects, sequential encoder 405 generates a sequence of hidden representations corresponding to the word embeddings, where the sequence of hidden representations includes an order based on an order of the words in the document. According to some aspects, sequential encoder 405 is configured to generate a sequence of hidden representations corresponding to the word embeddings.

For example, sequential encoder 405 can process the embedded sequence $\{e_j\}_{j=1}^{|x|}$, where |x| is the number of tokens in x, through one or more long short-term memory (LSTM) neural networks included in sequential encoder 405 to obtain corresponding hidden states $h_j \in \mathbb{R}^H$ and cell states $s_j \in \mathbb{R}^H$:

$$(h_j, s_j) = f_{LSTM}(e_j, (h_{j-1}, s_{j-1})) \quad (1)$$

where H is LSTM's hidden size. In some embodiments, a machine learning model according to embodiments of the present disclosure can construct a memory bank $M = \langle h_1, h_2, \ldots, h_{|x|} \rangle$. In some embodiments, sequential encoder 405 can construct the memory bank M. In some embodiments, the memory bank M is used in the operations of topic attention network 410.

An LSTM is a form of recurrent neural network (RNN) that includes feedback connections. In one example, and LSTM includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN.

An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

Topic attention network 410 can produce a context vector C. Further detail regarding the topic attention network 410 will be provided with reference to FIG. 5.

Figure 5:
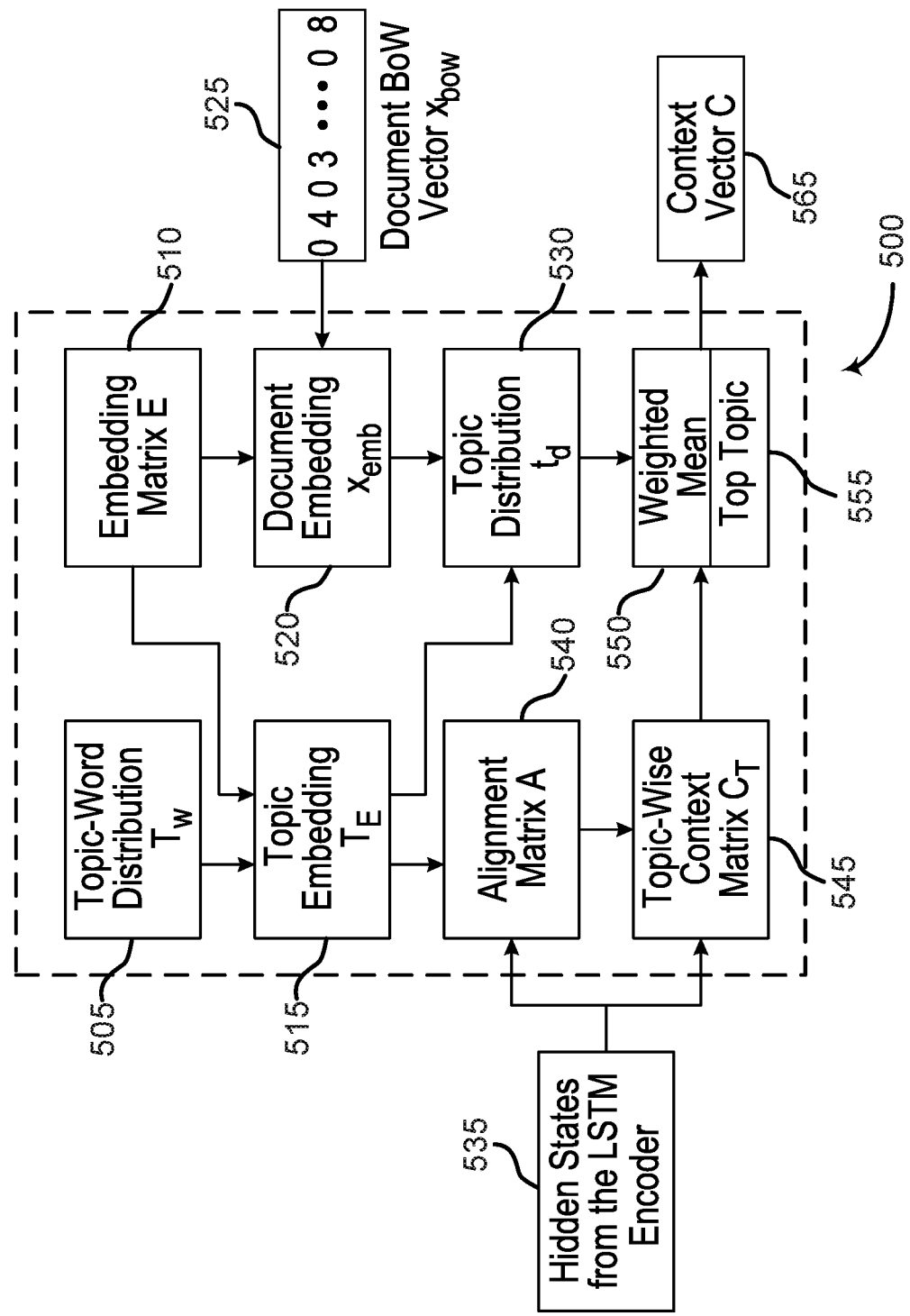
FIG. 5 shows an example of a topic attention network according to aspects of the present disclosure.

FIG. 5 shows an example of a topic attention network 500 according to aspects of the present disclosure. Topic attention network 500 is an example of, or includes aspects of, the corresponding element described with reference to FIGS. 3 and 4.

Referring to FIG. 5, topic attention network 500 generates a representation of a context of a document. According to some aspects, topic attention network 500 encodes a topic-word distribution matrix 505 using the embedding matrix 510 to obtain a topic embedding matrix 515, where the topic-word distribution matrix 505 represents relationships between the set of topics and the words of the vocabulary. In some aspects, the topic-word distribution matrix 505 is based on a linear layer used to decode a document—word representation from a latent vector.

For example, topic attention network 500 may attend on document words in a manner such that resultant attention is distributed according to semantics of the topics relevant to the document. This allows topic attention network 500 to encode better document features while capturing underlying latent document-topic representations. The topic-word distribution matrix 505 represents the affinity of each topic towards words in the vocabulary. The affinity can be used to interpret semantics of each topic. Therefore, topic attention network 500 factors $T_w \in \mathbb{R}^{K \times |V|}$ into an attention mechanism of topic attention network 500, where K denotes the number of topics.

An attention mechanism is a method of placing differing levels of importance on different elements of an input. Calculating attention may involve three basic steps. First, topic attention network 500 can compute a similarity between query and key vectors obtained from an input to generate attention weights. Similarity functions used in this step may include dot product, splice, detector, etc. Next, topic attention network 500 can use a softmax function to normalize the attention weights. Finally, topic attention network 500 weighs the attention weights in together with the corresponding values.

For example, topic attention network 500 can perform the attention on a sequence of tokens for each topic using the embedded representation of the topics $T_E \in \mathbb{R}^{K \times E}$ :

$$T_E = T_W E, \text{[topic embeddings]} \quad (2)$$

$$T_w = \text{softmax}(D), \text{[topic-word distribution]} \quad (3)$$

where $D \in \mathbb{R}^{K \times |V|}$ s a decoder layer of an auto-encoder according to embodiments of the present disclosure that is used to reconstruct document BoW vector $x_{bow}$ (i.e., word embeddings 525) as a reconstructed BoW vector $x_{rec}$ from the sampled latent vector document-topic representation z, as will be described with reference to FIG. 6.

In some examples, topic attention network 500 computes an attention alignment matrix 540 based on the topic embedding matrix 515 and the sequence of hidden representations 535. For example, topic attention network 500 can use topic embedding matrix 515 to determine an attention alignment matrix $A \in \mathbb{R}^{|x| \times K}$ between each topic $k \in \{1, 2, \ldots, K\}$ and the sequence of hidden representation of words in the document 535 such that:

$$A_{jk} = \frac{\exp(\text{score}((T_E)_k, h_j))}{\sum_{j'=1}^{|x|} \exp(\text{score}((T_E)_k, h_{j'}))}, \quad (4)$$

$$\text{score}((T_E)_k, h_j) = v_A^T \tanh(W_A[(T_E)_k; h_j])$$

where $v_A \in \mathbb{R}^P$, $W_A \in \mathbb{R}^{P \times (E+H)}$, $(T_E)_k \in \mathbb{R}^E$ is the embedded representation of the $k^{th}$ topic. In some examples, score $((T_E)_k, h_j)$ is a concatenation operation.

In some examples, topic attention network 500 computes a topic context matrix 545 based on the topic embedding matrix 515 and the word embeddings 525. In some examples, topic context matrix 545 is based on the attention alignment matrix 540. For example, topic attention network 500 can determine topic context matrix 545 corresponding to each topic as:

$$C_T = \Sigma_{j=1}^{|X|} A_j \otimes h_j, \text{[topic context matrix]} \quad (5)$$

where $\otimes$ denotes an outer product. $A_j \in \mathbb{R}^K$ (jth row of attention alignment matrix 540) is a K-dimensional vector and $h_j$ is a H-dimensional vector; therefore, $A_j \otimes h_j$ for each j yields a matrix of order K×H, hence $C_T \in \mathbb{R}^{K \times H}$.

In some examples, topic attention network 500 computes a context vector 565 for the document based on the document-topic vector 530 and the topic context matrix 545. In some examples, topic attention network 500 selects a row of the topic context matrix 545 corresponding to the highest value of the document-topic vector 530 as the context vector 565. In some examples, topic attention network 500 computes an average of rows of the topic context matrix 545 weighted by values of the document-topic vector 530 to obtain the context vector 565. In some examples, topic attention network 500 normalizes the word embeddings 525 based on a number of words in the vocabulary to obtain normalized word embeddings, where the document-topic vector 530 is based on the normalized word embeddings.

For example, topic attention network 500 can compute a final aggregated context vector c (i.e., context vector 565) as a weighted average over all rows of topic context matrix $C_T$ (i.e., topic context matrix 545), with each row representing each topic-specific context vector, and with document-topic proportion vector $t_d$ (i.e., document-topic vector 530) as weights:

$$c = \sum_{k=1}^{K} (t_d)_k (C_T)_k \quad (6)$$

where $(t_d)_k$ is a scalar, $(C_T)_k \in \mathbb{R}^H$ denotes the k-th row of matrix $C_T$, and $t_d$ is the document-topic distribution vector that signifies the topic proportions in a document.

In some examples, topic attention network 500 can compute a document embedding 520 based on the words in the document and the embedding matrix 510. In some examples, topic attention network 500 can compute a document-topic vector 530 based on the topic embedding matrix 515 and the document embedding 520. For example, topic attention network 500 can normalize document BoW vector $x_{bow}$ (i.e., word embeddings 525) to obtain normalized word embeddings $x_{norm}$ and embed the document BoW vector $x_{bow}$ using the embedding matrix E (i.e., embedding matrix 510), followed by multiplication with topic embedding $T_E \in \mathbb{R}^{K \times E}$ :

$$x_{norm} = \frac{x_{bow}}{\sum_{i=1}^{|V|} (x_{bow})_i}, \text{[normalized } BoW] \quad (7)$$

$$x_{emb} = x_{norm}^T E, \text{[document embedding]} \quad (8)$$

$$t_d = \text{softmax } (T_E x_{emb}), \text{[document-topic } dist.] \quad (9)$$

where $x_{norm} \in \mathbb{R}^{|V|}$, $x_{emb} \in \mathbb{R}^E$, and $t_d \in \mathbb{R}^K$.

In some embodiments, the context vector 565 is the output of topic attention network 500. In some embodiments, the context vector 565 is used by an auto-encoder for sampling the latent documents-topic vector. In some embodiments, topic attention network 500 is a weighted topic attention network that takes a weighted sum or mean 550 of topic context matrix 545 as context vector 565.

In some embodiments, topic attention network 500 takes a top topic 555 (i.e., a most probable topic) with the largest proportion in $t_d$ of topic context matrix 545 as context vector 565. For example, topic attention network 500 finds the index m of the most probable topic in $t_d$. Topic attention network 500 then determines context vector 565 to be the row corresponding to index m in topic context matrix 545.

According to some aspects, a topic selection component identifies a topic for the document based on the topic context matrix. According to some aspects, the topic selection component selects a topic for each document in a corpus of documents. For example, the topic selection component can process context vector 565 to identify the topics included in a document represented by the context vector 565.

Figure 6:
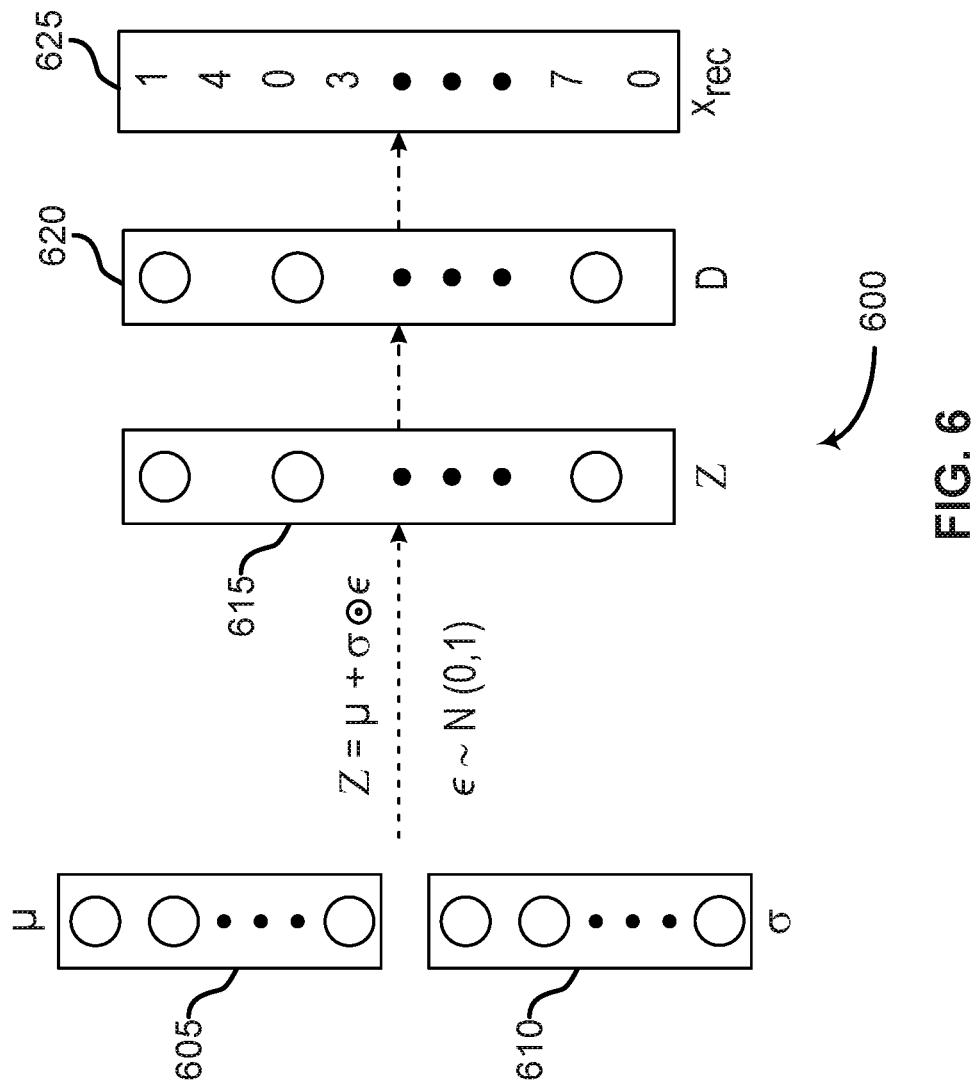
FIG. 6 shows an example of a topic selection component according to aspects of the present disclosure.

FIG. 6 shows an example of an auto-encoder according to aspects of the present disclosure. The example shown includes auto-encoder 600. Auto-encoder 600 is an example of, or includes aspects of, the corresponding element described with reference to FIG. 3.

According to some aspects, auto-encoder 600 is a variational auto-encoder that mimics Latent Dirichlet Allocation (LDA), which is a generative statistical model. LDA is an iterative process where for each document d, a topic distribution θ is drawn from Dirichlet(α) distribution. For each word w in d at index i, auto-encoder 600 samples a topic $t_i$ from Multinomial(θ) distribution. Auto-encoder 600 samples $w_i$ from $p(w_i|t_i, β)$ distribution, which is a multinomial probability conditioned on topic $t_i$. Given a corpus of documents and the parameters α and β, auto-encoder 600 determines the joint probability distribution of a topic mixture θ, a set of K topics t, and a set of n words w by using an intractable integral. Auto-encoder 600 obtains the result for the intractable integral by using variational inference to convert the task of finding the intractable integral into an optimization task for finding various parameters that minimize the KL divergence between a prior and posterior distribution.

According to some aspects, auto-encoder 600 generates a first vector 605 and a second vector 610 based on the context vector that is output by a topic attention network as described with reference to FIG. 5. For example, auto-encoder 600 can process the document BoW vector $x_{bow}$ described with reference to FIG. 5 with a multi-layer perceptron that forks into two independently trainable layers to yield $z_μ$ and $z_{\log σ^2}$.

In some examples, auto-encoder 600 samples a random noise term ε. In some examples, auto-encoder 600 generates a latent vector 615 based on the context vector. In some examples, auto-encoder 600 computes a sum of the first vector 605 and a product of the second vector 610 and the random noise term ε to obtain the latent vector 615. For example, auto-encoder 600 can use re-parametrization to sample the latent vector z (i.e., latent vector 615) from a logistic-normal distribution resulting from an approximation of Dirichlet distribution.

In some examples, auto-encoder 600 decodes the latent vector 615 to obtain a predicted word vector 625. For example, auto-encoder 600 can use the latent vector z with a single dense decoder layer D (i.e., decoder layer 620) to yield the reconstructed BoW vector $x_{rec}$ (i.e., predicted word vector 625).

According to some aspects, a training component computes a loss function based on a comparison between the predicted word vector 625 and the words in the document, where the training the topic attention network is further based on the loss function. According to some aspects, the training component computes a loss function based on an output of the auto-encoder. In some examples, the training component computes the loss function based on a comparison between the predicted word vector 625 and the words in the document. For example, the loss function includes a Kullback-Leibler (KL) divergence term to match a variational posterior over latent variables with a prior and a reconstruction term that represents categorical cross entropy loss between $x_{bow}$ & $x_{rec}$:

$$L_{NTM} = D_{KL}(p(z)\|q(z|x)) - \mathbb{E}_{q(z|x)}[p(x|z)] \quad (10)$$

In some embodiments, the prior is a Laplace approximation to Dirichlet prior. Auto-encoder 600 and the topic-word distribution influence each other during the training process, which consequently results in a convergence to better and more accurate topic identification.

In some examples, auto-encoder 600, in conjunction with a key phrase encoder-decoder network, generates a key phrase for the document. For example, a key phrase generation module of auto-encoder 600 can encode an input sequence of words into a latent document-topic vector. A separate key phrase decoder module can use a unidirectional gated recurrent unit (GRU) that attends on the encoder outputs and takes the latent document-topic vector from the topic model as input in a differentiable manner.

Topic Modeling

A method for topic modeling is described with reference to FIGS. 7 and 8. One or more aspects of the method include encoding words of a document using an embedding matrix to obtain word embeddings for the document, wherein the words in the document comprise a subset of words in a vocabulary, and wherein the embedding matrix is trained as part of a topic attention network based on a plurality of topics; encoding a topic-word distribution matrix using the embedding matrix to obtain a topic embedding matrix, wherein the topic-word distribution matrix represents relationships between the plurality of topics and the words of the vocabulary; computing a topic context matrix based on the topic embedding matrix and the word embeddings; and identifying a topic for the document based on the topic context matrix.

Some examples of the method include generating a sequence of hidden representations corresponding to the word embeddings using a sequential encoder, wherein the sequence of hidden representations comprises an order based on an order of the words in the document. Some examples further include computing an attention alignment matrix based on the topic embedding matrix and the sequence of hidden representations, wherein the topic context matrix is based on the attention alignment matrix. Some examples further include computing a context vector for the document based on the document-topic vector and the topic context matrix, wherein the topic attention network is trained based on the topic context matrix. Some examples further include training the topic attention network based on the context vector.

Some examples of the method further include generating a first vector and a second vector based on the context vector. Some examples further include sampling a random noise term. Some examples further include computing a sum of the first vector and a product of the second vector and the random noise term to obtain a latent vector. Some examples further include decoding the latent vector to obtain a predicted word vector. Some examples further include computing a loss function based on a comparison between the predicted word vector and the words in the document, wherein the training the topic attention network is based on the loss function.

In some aspects, the topic-word distribution matrix is based on a linear layer used to decode a document—word representation from the latent vector. Some examples of the method further include selecting a row of the topic context matrix corresponding to the highest value of the document-topic vector as the context vector. Some examples of the method further include computing an average of rows of the topic context matrix weighted by values of the document-topic vector to obtain the context vector. Some examples of the method include normalizing the word embeddings based on a number of words in the vocabulary, wherein the document-topic vector is based on the normalized word embeddings.

Some examples of the method include generating a key phrase for the document using words associated with the topic. Some examples of the method further include identifying a set of words for each of the plurality of topics based on the topic-word distribution matrix. Some examples of the method further include selecting a topic for each document in a corpus of documents. Some examples of the method further include selecting the words in the vocabulary based on a corpus of documents, wherein the document is selected from the corpus of documents.

Figure 7:
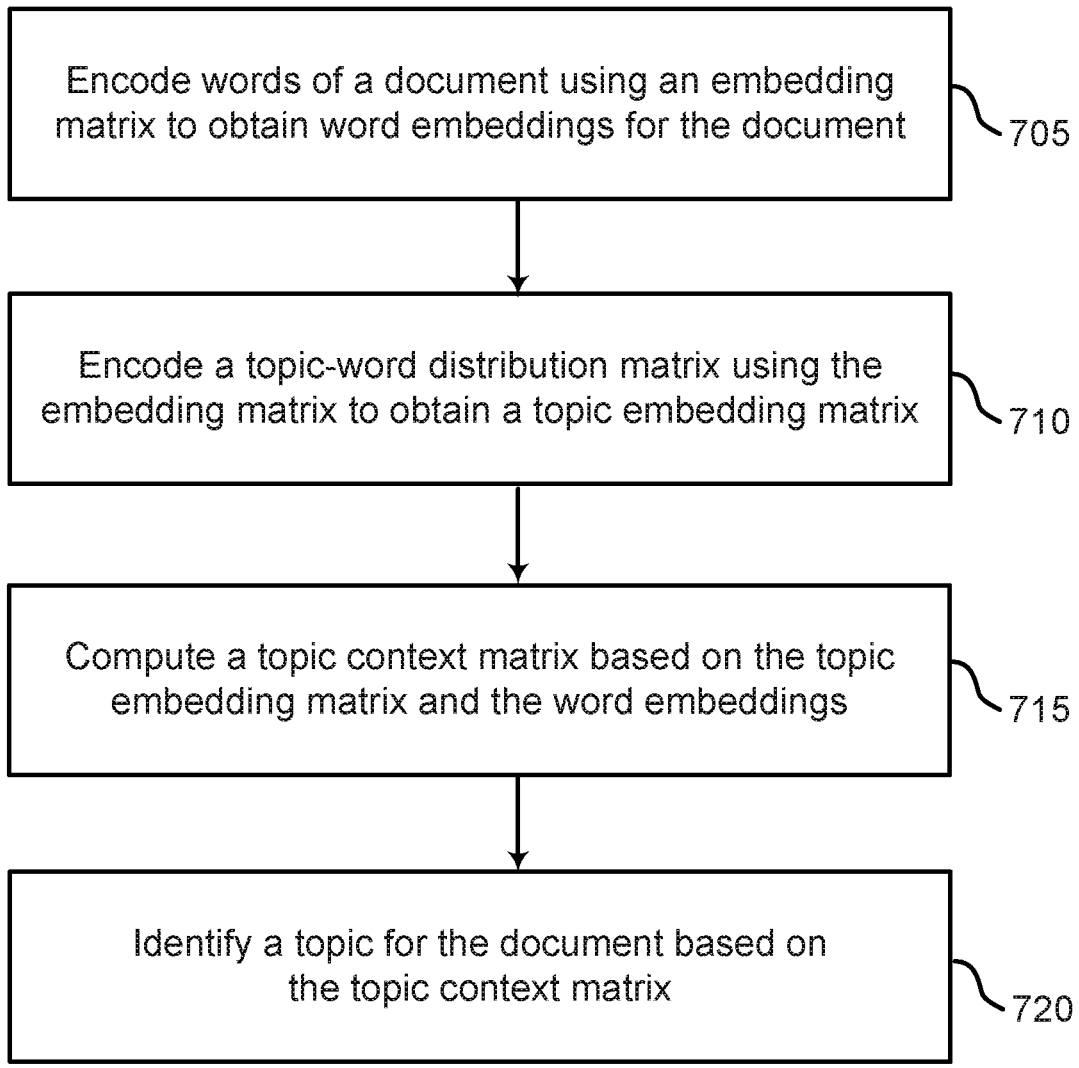
FIG. 7 shows an example of a process for topic modeling according to aspects of the present disclosure.

FIG. 7 shows an example of a topic modeling process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, a user can provide a document to a topic modeling apparatus via a user device. The topic modeling apparatus can generate a representation of the context of the document, identify a topic for the document, and provide a topic to the users. Topic modeling is an example of an LSA application. Generally, topic models have been used to extract topics which occur commonly across documents in a corpus. Typically, each topic is interpreted as a group of semantically coherent words that represent a common concept. In addition to gaining insights from unstructured texts, topic models have been used in several tasks, such as learning text representations for document classification, key phrase extraction, understanding reviews for e-commerce recommendations, semantic similarity detection between texts, etc.

For example, in some cases, a user can select a document of which knowledge of its topic would be beneficial (such as a forum post, an e-commerce website, a news article, an encyclopedia entry, etc.) and provide the document to the topic modeling apparatus via a user device. A machine learning model of the topic modeling apparatus can then process the document via one or more deep-learning based neural networks to create a machine readable representation of the document from which a topic can be identified. The machine learning model of the topic modeling apparatus can then process the machine readable representation of the document to identify a topic of the document via one or more deep-learning based neural networks.

At operation 705, the system encodes words of a document using an embedding matrix to obtain word embeddings for the document, where the words in the document include a subset of words in a vocabulary, and where the embedding matrix is trained as part of a topic attention network based on a set of topics. In some cases, the operations of this step refer to, or may be performed by, an embedding component as described with reference to FIGS. 3 and 4. For example, the embedding component can obtain word embeddings for the document as described with reference to FIG. 4, and the embedding matrix can be trained as described with reference to FIGS. 3 and 6.

At operation 710, the system encodes a topic-word distribution matrix using the embedding matrix to obtain a topic embedding matrix, where the topic-word distribution matrix represents relationships between the set of topics and the words of the vocabulary. In some cases, the operations of this step refer to, or may be performed by, a topic attention network as described with reference to FIGS. 3-5. For example, the topic attention network can obtain the topic embedding matrix as described with reference to FIG. 5.

At operation 715, the system computes a topic context matrix based on the topic embedding matrix and the word embeddings. In some cases, the operations of this step refer to, or may be performed by, a topic attention network as described with reference to FIGS. 3-5. For example, the topic attention network can compute the topic context matrix as described with reference to FIG. 5.

At operation 720, the system identifies a topic for the document based on the topic context matrix. In some cases, the operations of this step refer to, or may be performed by, a topic selection component as described with reference to FIGS. 3-6. For example, the topic selection component can identify the topic for the document as described with reference to FIGS. 3 and 5.

Figure 8:
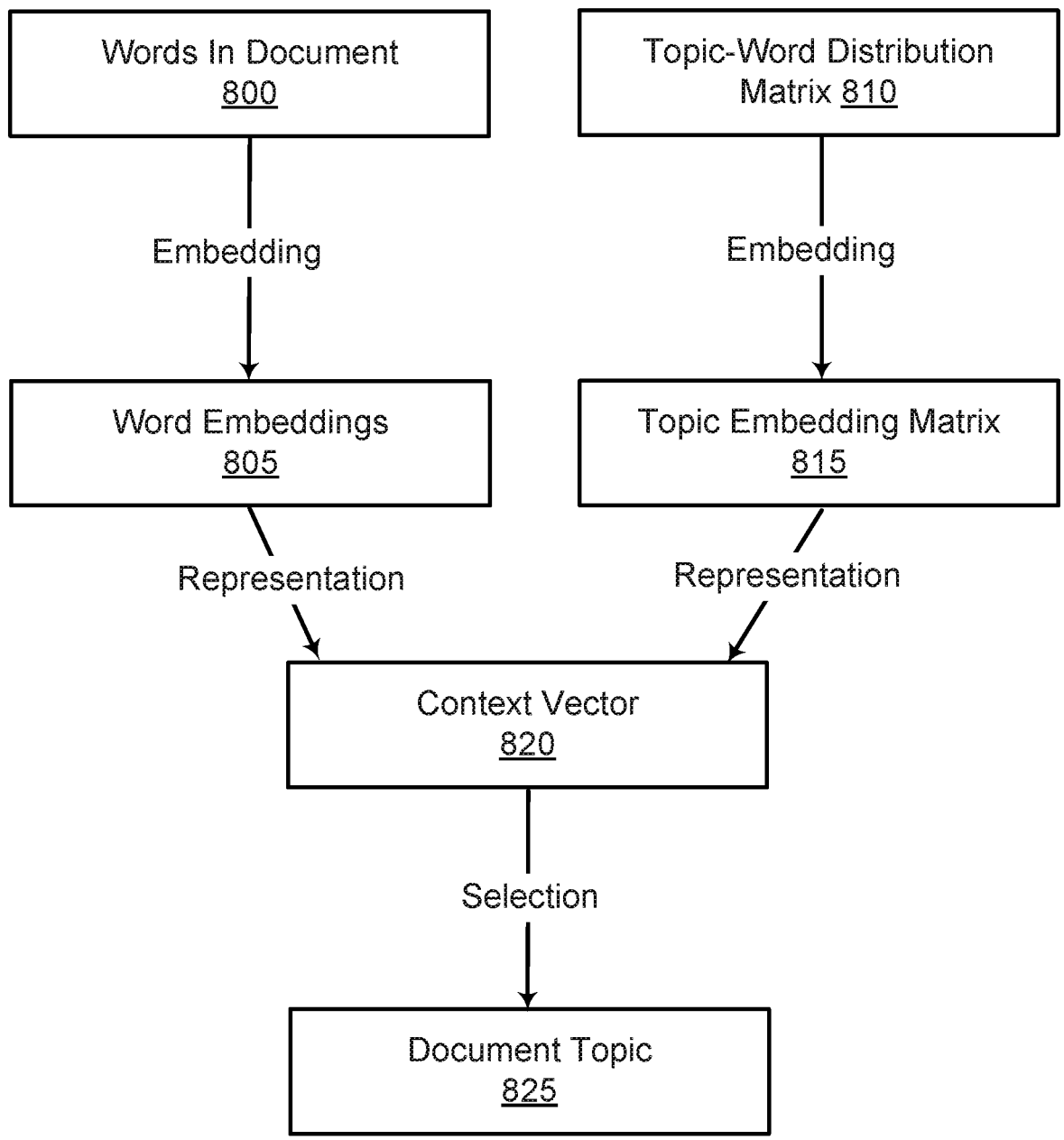
FIG. 8 shows an example of a topic modeling process according to aspects of the present disclosure.

FIG. 8 shows an example of a topic modeling process according to aspects of the present disclosure. The example shown includes words in document 800, word embeddings 805, topic-word distribution matrix 810, topic embedding matrix 815, context vector 820, and document topic 825.

Referring to FIG. 8, both the words in the document 800 and the topic-word distribution matrix 810 are input to an embedding process of an embedding component according to aspects of the present disclosure to output word embeddings 805 and topic embedding matrix 815. The embedding process of the embedding component is described with reference to FIG. 4.

The word embeddings 805 and topic embedding matrix 815 are input to a representation process of a topic attention network according to aspects of the present disclosure to output context vector 820. The representation process of the topic attention network is described with reference to FIG. 5.

The context vector 820 is input to a selection process of a topic selection component according to aspects of the present disclosure to output document topic 825. The topic selection process of the topic selection component is described with reference to FIG. 5.

Training

A method for topic modeling is described with reference to FIGS. 9-11. One or more aspects of the method include encoding words of a document using an embedding matrix to obtain word embeddings for the document, wherein the words in the document comprise a subset of words in a vocabulary; generating a sequence of hidden representations corresponding to the word embeddings using a sequential encoder, wherein the sequence of hidden representations comprises an order based on an order of the words in the document; computing a context vector based on the sequence of hidden representations; generating a latent vector based on the context vector; computing a loss function based on an output of the auto-encoder; and updating parameters of the embedding matrix and the topic attention network based on the output of the auto-encoder.

Some examples of the method further include encoding a topic-word distribution matrix using the embedding matrix to obtain a topic embedding matrix, wherein the topic-word distribution matrix represents relationships between the topics and the words of the vocabulary. Some examples further include computing a document embedding based on the words in the document and the embedding matrix. Some examples further include computing a document-topic vector based on the topic embedding matrix and the document embedding. Some examples further include computing an attention alignment matrix based on the topic embedding matrix and the sequence of hidden representations. Some examples further include computing a topic context matrix based on the attention alignment matrix and the sequence of hidden representations, wherein the context vector is calculated based on the document-topic vector and the topic context matrix.

Some examples of the method further include generating a first vector and a second vector based on the context vector. Some examples further include sampling a random noise term. Some examples further include computing a sum of the first vector and a product of the second vector and the random noise term to obtain the latent vector. Some examples further include decoding the latent vector to obtain a predicted word vector, wherein the output of the auto-encoder comprises the predicted word vector. Some examples further include computing the loss function based on a comparison between the predicted word vector and the words in the document, wherein the training the topic attention network is based on the loss function.

Some examples of the method further include selecting a row of the topic context matrix corresponding to the highest value of the document-topic vector as the context vector. Some examples of the method further include computing an average of rows of the topic context matrix weighted by values of the document-topic vector to obtain the context vector. Some examples of the method further include normalizing the word embeddings based on a number of words in the vocabulary, wherein the document-topic vector is based on the normalized word embeddings.

Figure 9:
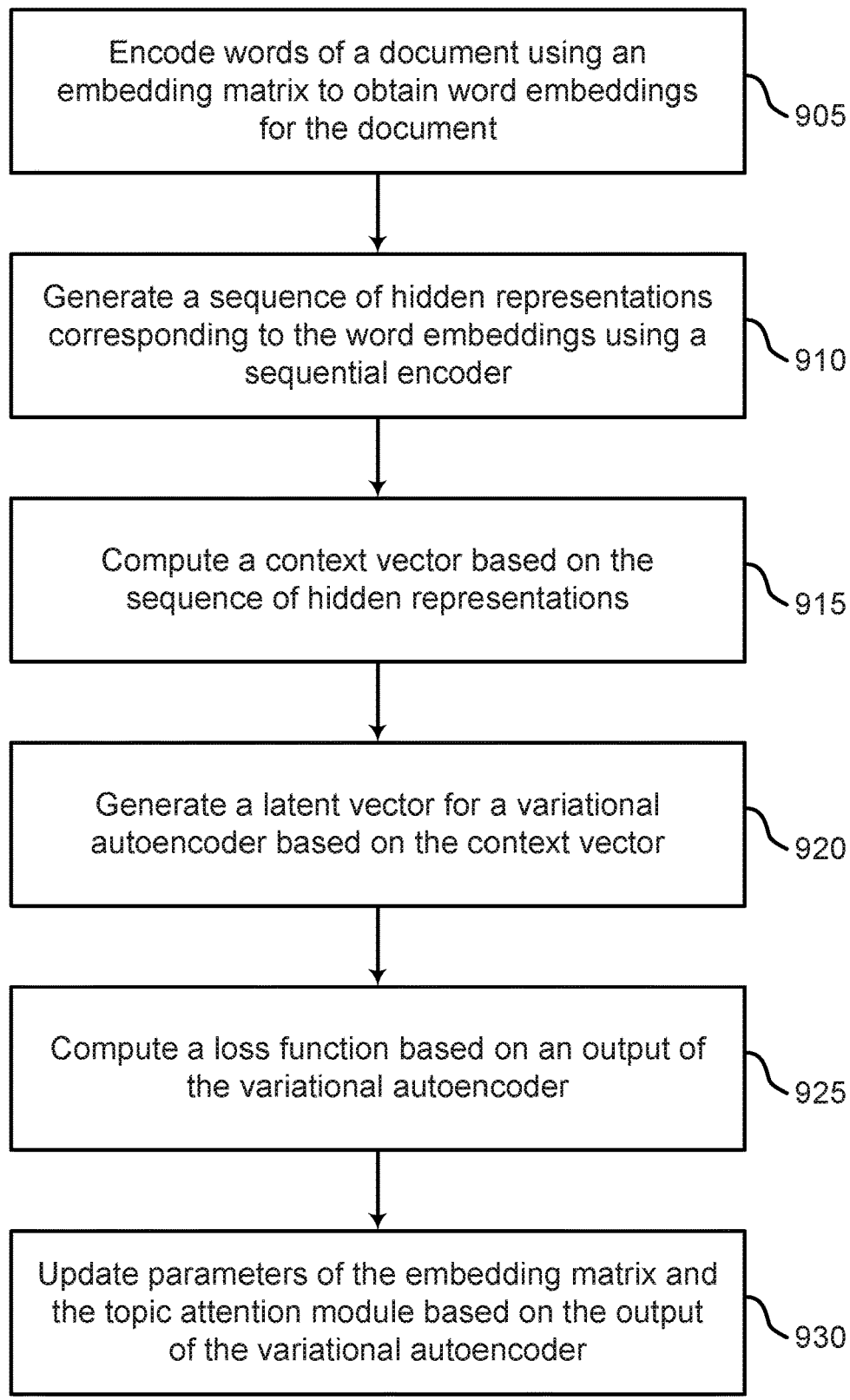
FIG. 9 shows an example of a process for training a machine learning model according to aspects of the present disclosure.

FIG. 9 shows an example of a process for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system encodes words of a document using an embedding matrix to obtain word embeddings for the document, where the words in the document include a subset of words in a vocabulary. In some cases, the operations of this step refer to, or may be performed by, embedding component as described with reference to FIGS. 3 and 4. For example, the embedding component can obtain word embeddings for the document as described with reference to FIG. 4.

At operation 910, the system generates a sequence of hidden representations corresponding to the word embeddings using a sequential encoder, where the sequence of hidden representations includes an order based on an order of the words in the document. In some cases, the operations of this step refer to, or may be performed by, a sequential encoder as described with reference to FIGS. 3 and 4. For example, the sequential encoder can generate the sequence of hidden representations as described with reference to FIG. 4.

At operation 915, the system computes a context vector based on the sequence of hidden representations. In some cases, the operations of this step refer to, or may be performed by, a topic attention network as described with reference to FIGS. 3-5. For example, the topic attention network can generate the context vector as described with reference to FIG. 5.

At operation 920, the system generates a latent vector based on the context vector. In some cases, the operations of this step refer to, or may be performed by, an auto-encoder as described with reference to FIGS. 3 and 6. For example, the auto-encoder can generate the latent vector as described with reference to FIG. 6.

At operation 925, the system computes a loss function based on an output of the auto-encoder. In some cases, the operations of this step refer to, or may be performed by, a training component as described with reference to FIG. 3. For example, the training component can compute the loss function as described with reference to FIG. 6.

At operation 930, the system updates parameters of the embedding matrix and the topic attention network based on the output of the auto-encoder. In some cases, the operations of this step refer to, or may be performed by, a training component as described with reference to FIG. 3. For example, the training component can update the parameters as described with reference to FIGS. 3 and 6.

Figure 10:
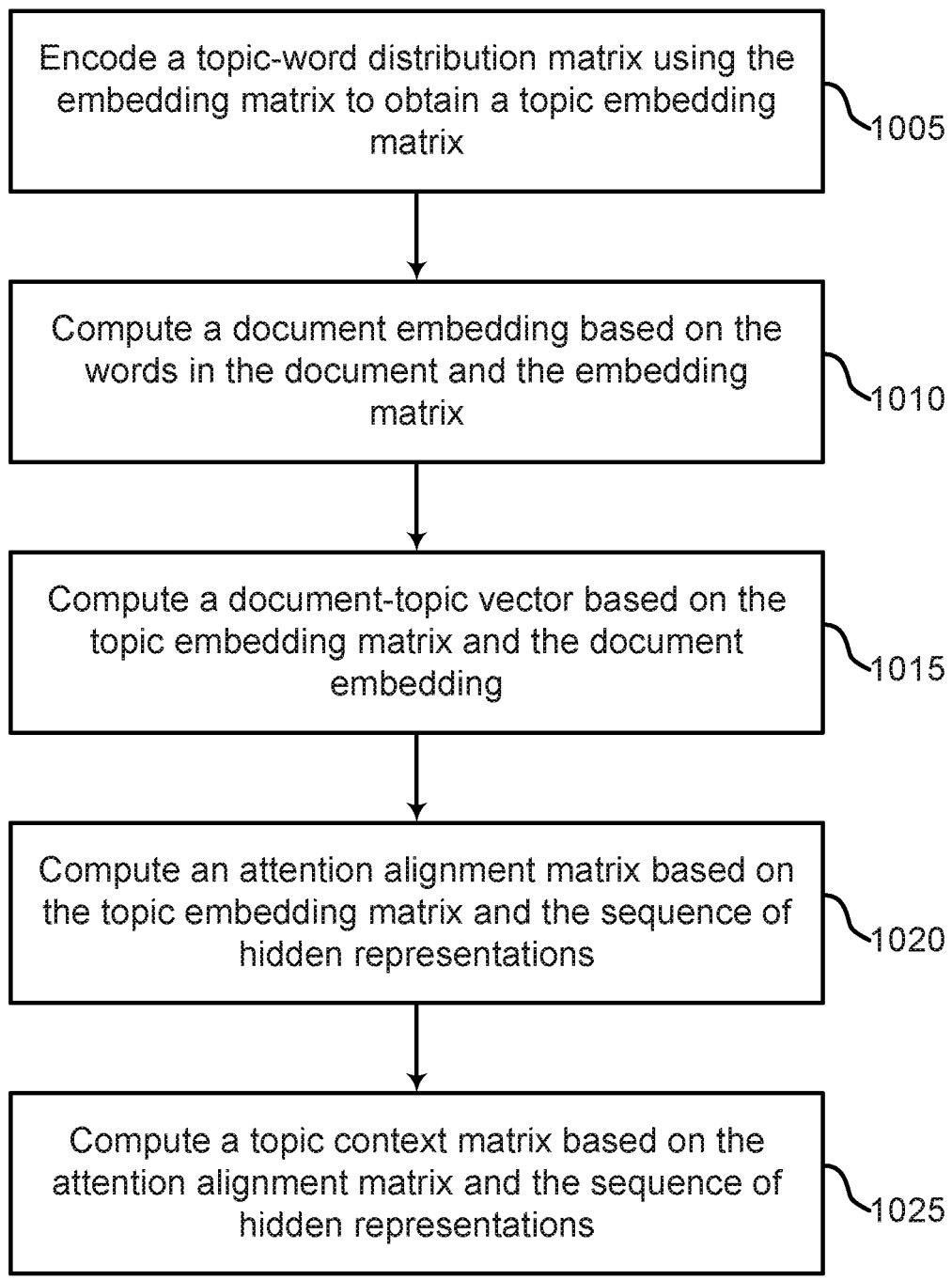
FIG. 10 shows an example of a process for calculating a topic context matrix based on an updated machine learning model according to aspects of the present disclosure.

FIG. 10 shows an example of a process for calculating a topic context matrix based on an updated machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system encodes a topic-word distribution matrix using the embedding matrix to obtain a topic embedding matrix, where the topic-word distribution matrix represents relationships between the topics and the words of the vocabulary. In some cases, the operations of this step refer to, or may be performed by, a topic attention network as described with reference to FIGS. 3-5. For example, the topic attention network can obtain the topic embedding matrix as described with reference to FIG. 5.

At operation 1010, the system computes a document embedding based on the words in the document and the embedding matrix. In some cases, the operations of this step refer to, or may be performed by, a topic attention network as described with reference to FIGS. 3-5. For example, the topic attention network can compute the document embedding as described with reference to FIG. 5.

At operation 1015, the system computes a document-topic vector based on the topic embedding matrix and the document embedding. In some cases, the operations of this step refer to, or may be performed by, a topic attention network as described with reference to FIGS. 3-5. For example, the topic attention network can compute the document-topic vector as described with reference to FIG. 5.

At operation 1020, the system computes an attention alignment matrix based on the topic embedding matrix and the sequence of hidden representations. In some cases, the operations of this step refer to, or may be performed by, a topic attention network as described with reference to FIGS. 3-5. For example, the topic attention network can compute the attention alignment matrix as described with reference to FIG. 5.

At operation 1025, the system computes a topic context matrix based on the attention alignment matrix and the sequence of hidden representations, where the context vector is calculated based on the document-topic vector and the topic context matrix. In some cases, the operations of this step refer to, or may be performed by, a topic attention network as described with reference to FIGS. 3-5. For example, the topic attention network can compute the topic context matrix as described with reference to FIG. 5.

Figure 11:
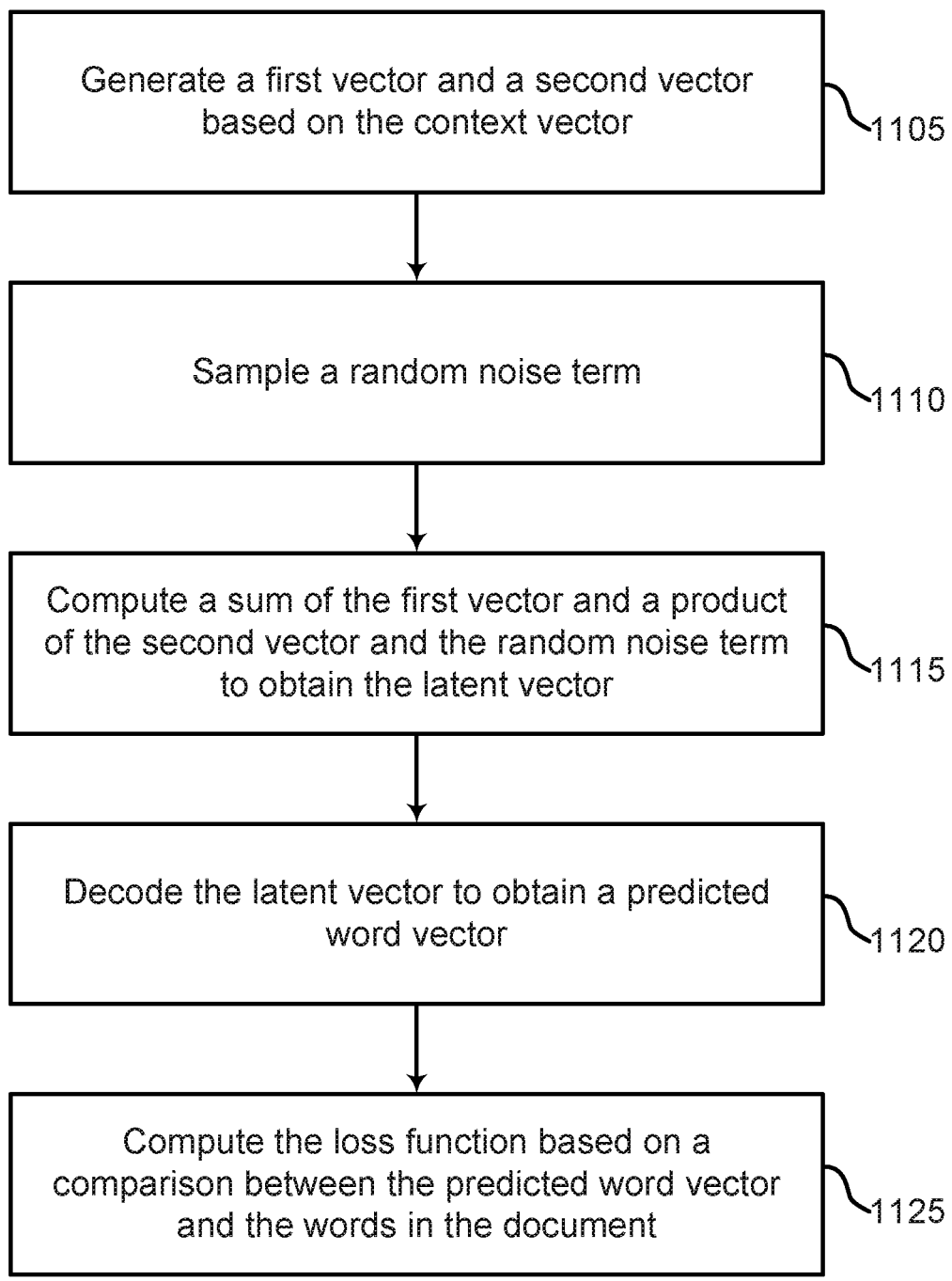
FIG. 11 shows an example of a process for computing a loss function according to aspects of the present disclosure.

FIG. 11 shows an example of 1100 for computing a loss function according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates a first vector and a second vector based on the context vector. In some cases, the operations of this step refer to, or may be performed by, an auto-encoder as described with reference to FIGS. 3 and 6.

At operation 1110, the system samples a random noise term. In some cases, the operations of this step refer to, or may be performed by, auto-encoder as described with reference to FIGS. 3 and 6.

At operation 1115, the system computes a sum of the first vector and a product of the second vector and the random noise term to obtain the latent vector. In some cases, the operations of this step refer to, or may be performed by, auto-encoder as described with reference to FIGS. 3 and 6.

At operation 1120, the system decodes the latent vector to obtain a predicted word vector, where the output of the auto-encoder includes the predicted word vector. In some cases, the operations of this step refer to, or may be performed by, auto-encoder as described with reference to FIGS. 3 and 6. For example, the auto-encoder can obtain the predicted word vector as described with reference to FIG. 6.

At operation 1125, the system computes the loss function based on a comparison between the predicted word vector and the words in the document, where the training the topic attention network is further based on the loss function. In some cases, the operations of this step refer to, or may be performed by, a training component as described with reference to FIG. 3. For example, the training component can compute the loss function as described with reference to FIG. 6.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for topic modeling, comprising:
encoding words of a document using an embedding matrix to obtain word embeddings for the document, wherein the words of the document comprise a subset of words in a vocabulary, and wherein the embedding matrix is trained as part of a topic attention network based on a plurality of topics;
encoding a topic-word distribution matrix using the embedding matrix to obtain a topic embedding matrix, wherein the topic-word distribution matrix represents relationships between the plurality of topics and the words of the vocabulary;
computing a topic context matrix based on the topic embedding matrix and the word embeddings; and
identifying a topic for the document based on the topic context matrix.

2. The method of claim 1, further comprising:
generating a sequence of hidden representations corresponding to the word embeddings using a sequential encoder, wherein the sequence of hidden representations comprises an order based on an order of the words in the document;

computing an attention alignment matrix based on the topic embedding matrix and the sequence of hidden representations, wherein the topic context matrix is based on the attention alignment matrix;

computing a context vector for the document based on a document-topic vector and the topic context matrix, wherein the topic attention network is trained based on the topic context matrix; and training the topic attention network based on the context vector.

3. The method of claim 2, further comprising:
generating a first vector and a second vector based on the context vector;
sampling a random noise term;
computing a sum of the first vector and a product of the second vector and the random noise term to obtain a latent vector;
decoding the latent vector to obtain a predicted word vector; and
computing a loss function based on a comparison between the predicted word vector and the words in the document, wherein the training the topic attention network is further based on the loss function.

4. The method of claim 3, wherein:
the topic-word distribution matrix is based on a linear layer used to decode a document-word representation from the latent vector.

5. The method of claim 2, further comprising:
selecting a row of the topic context matrix corresponding to a highest value of the document-topic vector as the context vector.

6. The method of claim 2, further comprising:
computing an average of rows of the topic context matrix weighted by values of the document-topic vector to obtain the context vector.

7. The method of claim 2, further comprising:
normalizing the word embeddings based on a number of words in the vocabulary to obtain normalized word embeddings, wherein the document-topic vector is based on the normalized word embeddings.

8. The method of claim 1, further comprising:
generating a key phrase for the document using words associated with the topic.

9. The method of claim 1, further comprising:
identifying a set of words for each of the plurality of topics based on the topic-word distribution matrix.

10. The method of claim 1, further comprising:
selecting a topic for each document in a corpus of documents.

11. The method of claim 1, further comprising:
selecting the words in the vocabulary based on a corpus of documents, wherein the document is selected from the corpus of documents.

12. A method for topic modeling, comprising:
encoding words of a document using an embedding matrix to obtain word embeddings for the document, wherein the words of the document comprise a subset of words in a vocabulary;
generating a sequence of hidden representations corresponding to the word embeddings using a sequential encoder, wherein the sequence of hidden representations comprises an order based on an order of the words in the document;

computing a context vector for the document based on the sequence of hidden representations;
generating a latent vector based on the context vector using an auto-encoder;
computing a loss function based on the latent vector;
updating parameters of the embedding matrix and a topic attention network based on the loss function; and
predicting, using the embedding matrix and the topic attention network, a set of words including a topic for an input document based on a context vector for the input document.

13. The method of claim 12, further comprising:
encoding a topic-word distribution matrix using the embedding matrix to obtain a topic embedding matrix, wherein the topic-word distribution matrix represents relationships between the topics and the words of the vocabulary;
computing a document embedding based on the words in the document and the embedding matrix;
computing a document-topic vector based on the topic embedding matrix and the document embedding;
computing an attention alignment matrix based on the topic embedding matrix and the sequence of hidden representations; and
computing a topic context matrix based on the attention alignment matrix and the sequence of hidden representations, wherein the context vector is calculated based on the document-topic vector and the topic context matrix.

14. The method of claim 13, further comprising:
generating a first vector and a second vector based on the context vector;
sampling a random noise term;
computing a sum of the first vector and a product of the second vector and the random noise term to obtain the latent vector;
decoding the latent vector to obtain a predicted word vector; and
computing the loss function based on a comparison between the predicted word vector and the words in the document.

15. The method of claim 13, further comprising:
selecting a row of the topic context matrix corresponding to a highest value of the document-topic vector as the context vector.

16. The method of claim 13, further comprising:
computing an average of rows of the topic context matrix weighted by values of the document-topic vector to obtain the context vector.

17. The method of claim 13, further comprising:
normalizing the word embeddings based on a number of words in the vocabulary to obtain normalized word embeddings, wherein the document-topic vector is based on the normalized word embeddings.

18. An apparatus for topic modeling, comprising:
an embedding component configured to encode words of a document using an embedding matrix to obtain word embeddings for the document, wherein the words in the document comprise a subset of words in a vocabulary from a corpus of documents, and wherein the embedding matrix is trained based on the corpus of documents;
a sequential encoder configured to generate a sequence of hidden representations corresponding to the word embeddings;
a topic attention network configured to compute a topic context matrix based on the embedding matrix and the sequence of hidden representations and to generate a context vector based on the word embeddings and the topic context matrix; and an auto-encoder configured to predict a set of words for the document based on the context vector.

19. The apparatus of claim 18, further comprising:

a topic selection component configured to select a topic for each document in a corpus of documents.

20. The apparatus of claim 18, further comprising:

a vocabulary component configured to select the words in the vocabulary based on a corpus of documents.

* * * * *